United States Patent
Nagumo et al.

(10) Patent No.: US 6,603,496 B2
(45) Date of Patent: Aug. 5, 2003

(54) IMAGE RECORDING METHOD AND APPARATUS ENLARGING ISOLATED DOTS

(75) Inventors: Akira Nagumo, Tokyo (JP); Toshiki Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 2 days.

(21) Appl. No.: 09/984,600

(22) Filed: Oct. 30, 2001

(65) Prior Publication Data

US 2002/0075372 A1 Jun. 20, 2002

(30) Foreign Application Priority Data

Nov. 2, 2000 (JP) .......................................... 2000-335594
Oct. 22, 2001 (JP) .......................................... 2001-323295

(51) Int. Cl.[7] .............................. G03G 15/00; B41J 2/45
(52) U.S. Cl. ........................ 347/131; 347/132; 347/133; 347/237; 347/240
(58) Field of Search .............................. 347/130, 131, 347/133, 237, 247; 399/44

(56) References Cited

U.S. PATENT DOCUMENTS

| 5,252,996 A | * | 10/1993 | Tsuda .......................... 347/130 |
| 5,946,021 A | * | 8/1999 | Kawata ........................ 347/237 |
| 6,292,205 B1 | * | 9/2001 | Nakayasu et al. .......... 347/131 |

FOREIGN PATENT DOCUMENTS

| JP | 63064763 A | * | 3/1988 |
| JP | 05008438 A |   | 1/1993 |
| JP | 07246730 A |   | 9/1995 |

* cited by examiner

*Primary Examiner*—Joan Pendegrass

(57) ABSTRACT

A dot-matrix image-forming device such as an electrophotographic printer alters the size of a dot according to the surrounding dot pattern, thereby compensating for the tendency of isolated dots or small groups of dots to be undersized due to characteristics of the image formation process. Alternatively, the device may add dots to or delete dots from a contiguous group of dots to achieve substantially the same effect. Preferably, the device both adds or deletes dots and alters the dot size. This compensation scheme enables the total area occupied by dots in a given image region to be proportional to the number of dots in the region, regardless of the dot density and arrangement in the region.

17 Claims, 19 Drawing Sheets

1110

1101

1100

1001

1011

1010

1001

0101

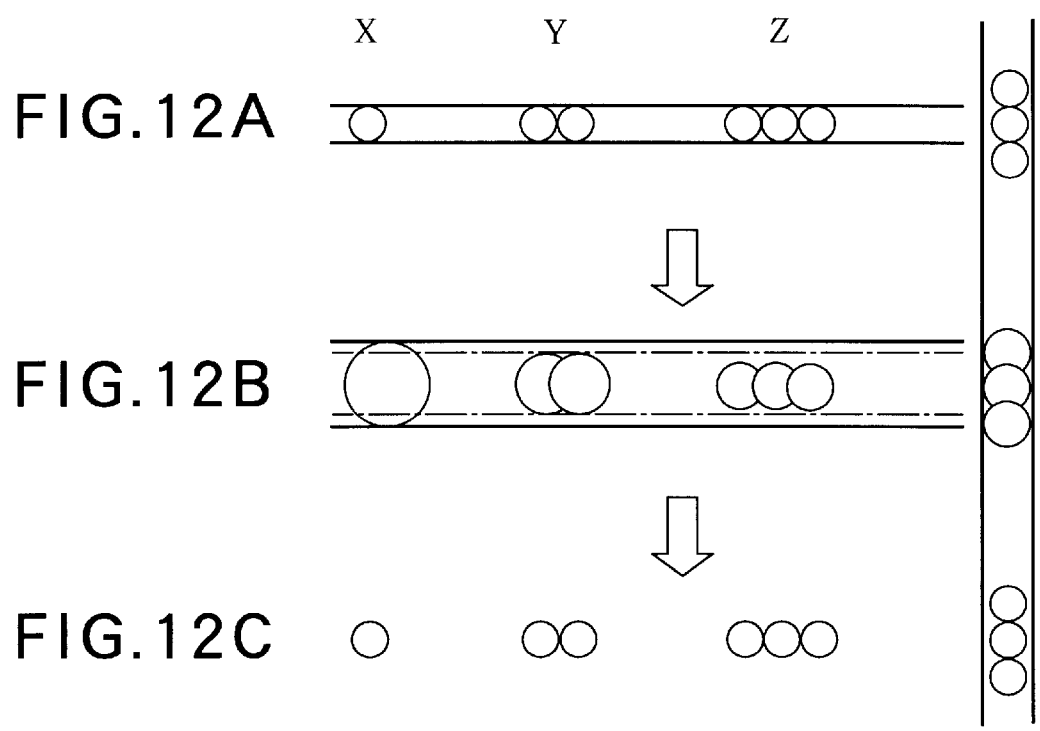

A : 1101
B : 1110
C : 1111

A : 1010
B : 1011
C : 1100

A : 1100
B : 1101
C : 1110

A : 1010
B : 1010
C : 1011

A : 1011
B : 1100
C : 1110

A : 1000
B : 1001
C : 1010

A : 1000
B : 1001
C : 1010

A : 0100
B : 0101
C : 0110

PATTERN a-1

PATTERN a-2

IMAGE RECORDING METHOD AND APPARATUS ENLARGING ISOLATED DOTS

BACKGROUND OF THE INVENTION

1. Field of the Invention

The present invention relates to an image recording apparatus, more particularly to an image recording apparatus that supplies adjustable driving current to a driven element by which an image is recorded, and to a method of recording an image using an apparatus of this type.

2. Description of the Related Art

Referring to FIG. 1, in an electrophotographic apparatus, a photosensitive member such as a photosensitive drum 51 is charged by a charging unit (CH) 35, then selectively illuminated by one or more light-emitting elements in, for example, a light-emitting-diode (LED) head 3 according to information to be printed, forming an electrostatic latent image on the photosensitive drum 51. The electrostatic latent image is developed by selective application of toner in a developer 52 to form a toner image, which is transferred to recording medium such as recording paper 53 by a transfer unit (T) 36, then fused to the paper. The elements shown in FIG. 1 form a type of printing mechanism 60.

One type of electrophotographic apparatus is an electrophotographic printer. A more detailed description of an electrophotographic printer will be given below with reference to FIG. 2, which is a block diagram of the control circuits of a conventional electrophotographic printer, and FIGS. 3 and 4, which are timing diagrams illustrating the operation of the conventional electrophotographic printer.

The printing control unit 1 in FIG. 2 is a computing device comprising a microprocessor, read-only memory (ROM), random-access memory (RAM), input-output ports, timers, and other facilities. Receiving signals SG1, SG2, etc. from a higher-order controller 55, the printing control unit 1 generates signals that control a sequence of operations for printing dot-mapped data given by signal SG2 (sometimes referred to as a video signal because it supplies the dot-mapped data one-dimensionally). The printing sequence starts when the printing control unit 1 receives a printing command from the higher-order controller by means of control signal SG1. First, a temperature (Temp.) sensor 43 is checked to determine whether the fuser 44 is at the necessary temperature for printing. If it is not, current is fed to a heater 44a to raise the temperature of the fuser 44.

When the fuser 44 is ready, the printing control unit 1 commands a motor driver 33 to drive a develop-transfer process motor (PM) 37, activates a charge signal SGC to turn on a charging power source 32, and thereby applies a voltage to the charging unit 35 to charge the surface of the photosensitive drum 51.

In addition, a paper sensor 41 is checked to confirm that paper is present in a cassette (not visible), and a size sensor 42 is checked to determine the size of the paper. If paper is present, a paper transport motor (PM) 38 is driven according to the size of the paper, first in one direction to transport the paper to a starting position sensed by a pick-up sensor 39, then in the opposite direction to transport the paper into the printing mechanism 60.

When the paper is in position for printing, the printing control unit 1 sends the higher-order controller 55 a timing signal SG3 (including a main scanning synchronization signal and a sub-scanning synchronization signal) as shown in FIG. 3. The higher-order controller 55 responds by sending the dot data for one page in the video signal SG2. The printing control unit 1 sends corresponding print data (HD-DATA) to the LED head 3 in synchronization with a clock signal (HD-CLK). The LED head 3 comprises a linear array of LEDs for printing respective dots (also referred to as picture elements or pixels).

After receiving data for one line of dots in the video signal SG2, the printing control unit 1 sends the LED head 3 a latch signal (HD-LOAD), causing the LED head 3 to store the print data (HD-DATA), then sends the LED head 3 a strobe signal (HD-STB), causing the LED head 3 to output light according to the stored print data (HD-DATA), thereby forming one line of dots in the electrostatic latent image. Output of the strobe signal (HD-STB) may overlap the transfer of the next line of the video signal SG2 and print data (HD-DATA), as illustrated in FIGS. 3 and 4.

Subsequent lines of print data are sent and received in the video signal SG2 in the same way. After each line has been stored, the LED head 3 is driven to emit light, selectively exposing the negatively charged surface of the photosensitive drum 51 to add another line of dots to the electrostatic latent image. When the printing control unit 1 activates control signal SG5, the developer power source 54 is switched on, applying a voltage to the developer 52, and negatively charged toner particles are attracted to the parts of the electrostatic latent image that were exposed to light, forming a toner image comprising black pixels (dots).

The photosensitive drum 51 continues to turn, carrying the toner image to the transfer unit 36. The high-voltage transfer power source 32 is turned on by control signal SG4 and supplies a positive voltage to the transfer unit 36, whereby the toner image is transferred onto the paper 53 as it passes between the photosensitive drum 51 and the transfer unit.

A temperature-humidity sensor 30 monitors the temperature and humidity inside the printer. The printing control unit 1 reads the temperature and humidity in the printer as necessary from the temperature-humidity sensor 30, thereby obtaining information about environmental conditions.

The printing control unit 1 has a table of transfer conditions corresponding to different ambient temperature and humidity conditions, and uses this table to select the optimum transfer conditions according to the environmental data read from the temperature-humidity sensor 30.

The paper 53 bearing the transferred toner image is transported to the fuser 44. When the paper 53 meets the fuser 44, the toner image is fused onto the paper 53 by heat generated by the heater 44a. Finally, the printed sheet of paper passes an exit sensor 40 and is ejected from the printer.

The printing control unit 1 controls the high-voltage transfer power source 32 according to the information detected by the size sensor 42 and pick-up sensor 39 so that voltage is applied to the transfer unit 36 only while paper 53 is passing between the transfer unit 36 and photosensitive drum 51. When the paper 53 passes the exit sensor 40, the printing control unit 1 turns off the high-voltage charging power source 31 and halts the developer-transfer process motor 37.

When a series of pages are printed, the above operations are repeated.

FIG. 5 shows the conventional circuit structure of an LED head 3. The print data signal HD-DATA and clock signal HD-CLK are received by a shift register 121 comprising, for example, two thousand four hundred ninety-six flip-flops FF1, FF2, . . . , FF2496 (this number of flip-flops is suitable for printing three hundred dots per inch on A4-size paper).

The latch signal HD-LOAD is received by a latch unit 122 comprising a corresponding number of latches LT1, LT2, ..., LT2496, which latch the data output by the shift-register flip-flops. The strobe signal HD-STB is supplied to a circuit 123 comprising an inverter G0, NAND gates G1, G2, ..., G2496, and switching elements (transistors) TR1, TR2, ..., TR2496 which are interconnected to drive a linear array of light-emitting elements (LEDs) LD1, LD2, ..., LD2496 when the latch and strobe signals are both low, provided the print data output from the corresponding latches are high (indicating black dots or, more generally, high-intensity pixels). The transistors TR1, TR2, ..., TR2496 operate as an array of driving elements, while the LEDs LD1, LD2, ..., LD2496 operate as an array of driven elements. The power source of the current that drives the light-emitting elements is denoted VDD.

A problem encountered in this type of electrophotographic printer is that the size of a printed black dot depends on the number of other black dots nearby. Consequently, as the number of black dots in a given region varies, the blackness of the region (the total area occupied by the black dots) does not increase consistently. In particular, as the number of contiguous black dots in a rectangular region varies (this number is shown on the horizontal axis in FIG. 6), the area covered by the contiguous black dots (shown on the vertical axis) does not vary proportionally. As the number of black dots decreases, the size of the black area decreases more sharply (characteristic 'a') instead of decreasing proportionally (characteristic 'b'). The reason for this phenomenon has to do with the characteristics of the transfer unit.

A result of this problem is that when the printer prints very small letters, fine lines, and sparse (low-density) dither patterns, the printed lines and dots do not have the intended thickness (density) or size. Printing quality is degraded accordingly.

Similar problems are encountered in color electrophotographic printers: the size of a printed high-intensity (i.e., non-white) pixel is affected by the number of other high-intensity pixels in its vicinity. This phenomenon is also seen in image recording apparatus other than electrophotographic apparatus.

SUMMARY OF THE INVENTION

An object of the present invention is to form an image in which the total area occupied by dots in an image area is proportional to the number of dots in the area, regardless of the dot density in the area.

A further object of the invention is to form an image in which the total area occupied by dots in an image area is proportional to the number of dots in the area, regardless of ambient temperature and humidity variations.

A first aspect of the invention provides a method of recording an image by supplying driving current to driven elements according to pixel data indicating pixel intensity. The method includes the step of adjusting the driving current supplied to form a high-intensity pixel according to intensities of other pixels nearby. Preferably, the driving current is increased as increasing numbers of low-intensity pixels are disposed near the high-intensity pixel, and greater weight is given to pixels in close proximity to the high-intensity pixel than to pixels that are farther away. The method may also include the steps of sensing ambient temperature and/or humidity conditions, and adjusting the driving current according to these conditions.

The first aspect of the invention also provides an image recording apparatus that records an image by supplying driving current to driven elements according to pixel data indicating pixel intensity. The image recording apparatus includes an adjustment circuit that adjusts the driving current as described above, and may also include a sensor for sensing ambient temperature and/or humidity conditions, enabling the adjustment circuit to adjust the driving current according to those conditions as well.

More specifically, the first aspect of the invention provides an image recording apparatus having an array of driven elements, an array of driving elements that record an image by supplying current to the driven elements according to pixel data, and a compensation circuit that adjusts the driving current supplied by each driving element. The compensation circuit includes an adjustment circuit that adjusts the driving current supplied to form a high-intensity pixel according to intensities of other pixels nearby, preferably according to the intensities of pixels in an M×N pixel block centered on the high-intensity pixel, where M and N are positive integers. The adjustment circuit may operate by comparing the M×N pixel block with a plurality of prestored patterns having prestored compensated data values. Each prestored pattern may have a plurality of compensated data values, which are selected according to ambient temperature and/or humidity conditions.

The array of driven elements may comprise light-emitting elements for selectively illuminating a photosensitive member responsive to driving current, and the array of driving elements may be adopted to supply the driving current to respective light-emitting elements according to pixel data indicating pixel intensities, thereby forming an electrostatic latent image on the photosensitive member.

A second aspect of the invention provides a method of recording an image by supplying driving current to driven elements according to pixel data indicating pixel intensity, including the step of altering the pixel data by changing a low-intensity pixel to a high-intensity pixel, thereby enlarging a contiguous group of high-intensity pixels, if the low-intensity pixel is surrounded by a predetermined pattern of high-intensity and low-intensity pixels. Preferably, this method also changes a high-intensity pixel to a low-intensity pixel, thereby enlarging a contiguous group of low-intensity pixels, if the high-intensity pixel is surrounded by another predetermined pattern of high-intensity and low-intensity pixels. The altered pixel data may vary over a range of intensity levels, depending on the surrounding pattern of pixels. The intensity level may also be selected according to ambient temperature and/or humidity conditions.

The second aspect of the invention also provides an image recording apparatus that records an image by supplying driving current to driven elements according to pixel data indicating pixel intensity. The image recording apparatus includes an adjustment circuit that alters the pixel data by changing a low-intensity pixel to a high-intensity pixel as described above.

More specifically, the second aspect of the invention provides an image recording apparatus having an array of driven elements, an array of driving elements that record an image by supplying current to the driven elements according to pixel data indicating pixel intensities, and a compensation circuit that adjusts the driving current supplied by each driving element. The compensation circuit includes an adjustment circuit that alters the pixel data by changing a low-intensity pixel to a high-intensity pixel as described above, preferably by changing the central pixel in an M×N pixel block according to the pattern of pixels in the block, preferably by comparing the M×N pixel block with a prestored plurality of M×N patterns, M and N being positive integers. The altered pixel data may vary over a range of intensity levels, depending on the surrounding pattern of pixels.

The array of driven elements may comprise light-emitting elements for selectively illuminating a photosensitive member responsive to driving current, and the array of driving elements may be adopted to supply the driving current to respective light-emitting elements according to pixel data indicating pixel intensities, thereby forming an electrostatic latent image on the photosensitive member.

BRIEF DESCRIPTION OF THE DRAWINGS

In the attached drawings:

FIGS. 12A, 12B, 12C, and 12D illustrate dot sizes at various stages of the printing process in the first embodiment;

FIGS. 30A, 30B, and 30C illustrate an isolated black pixel and the resulting alteration of print data in a fourth embodiment of the invention;

FIGS. 31A, 31B, 31C, 32A, 32B, and 32C illustrate isolated groups of two black pixels and the resulting alteration of print data in the fourth embodiment;

FIGS. 33A, 33B, and 33C illustrate an isolated white pixel and the resulting alteration of print data in the fourth embodiment.

DETAILED DESCRIPTION OF THE INVENTION

Figure 1:
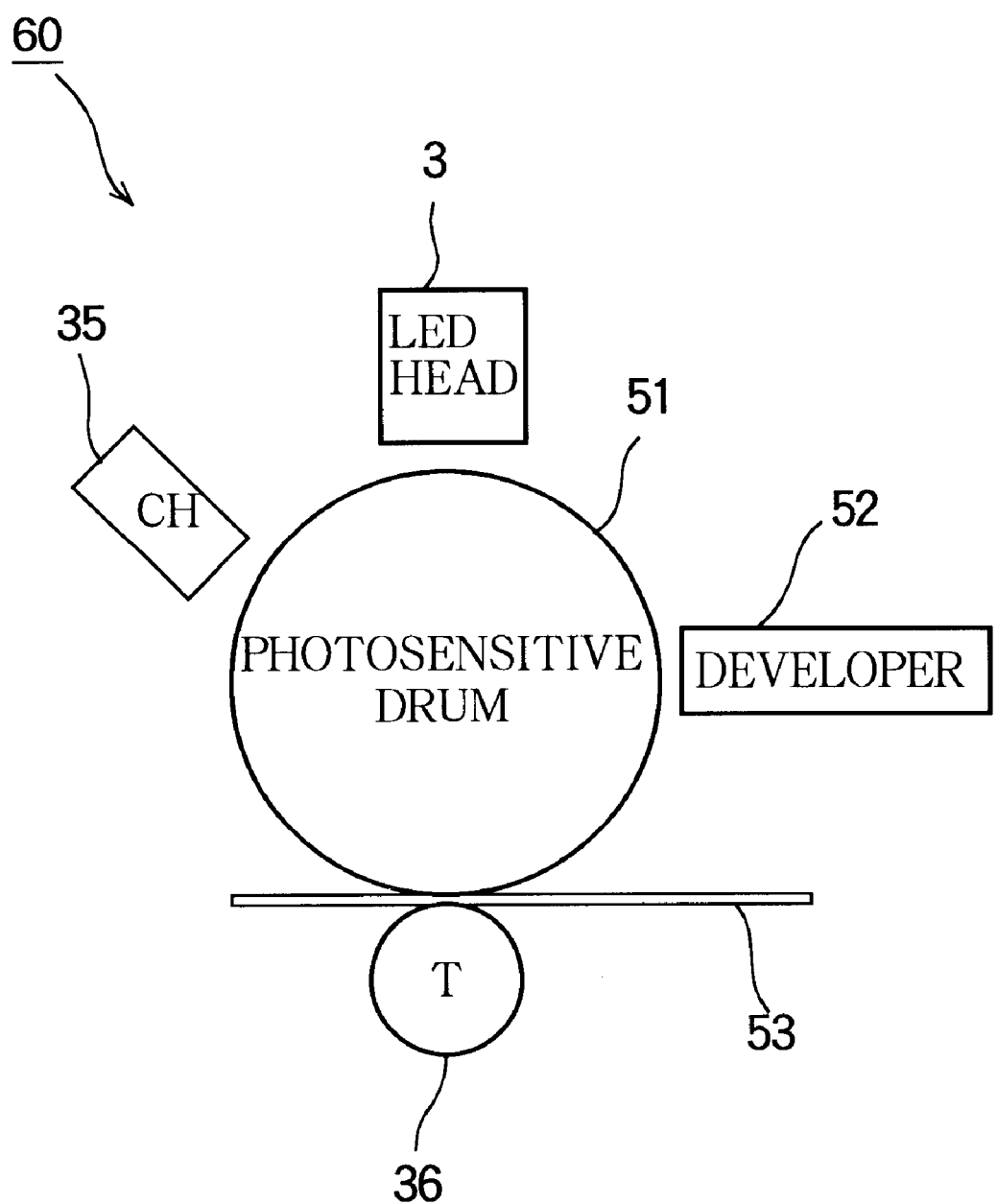
FIG. 1 is a schematic sectional view of a conventional electrophotographic printer.
Figure 2:
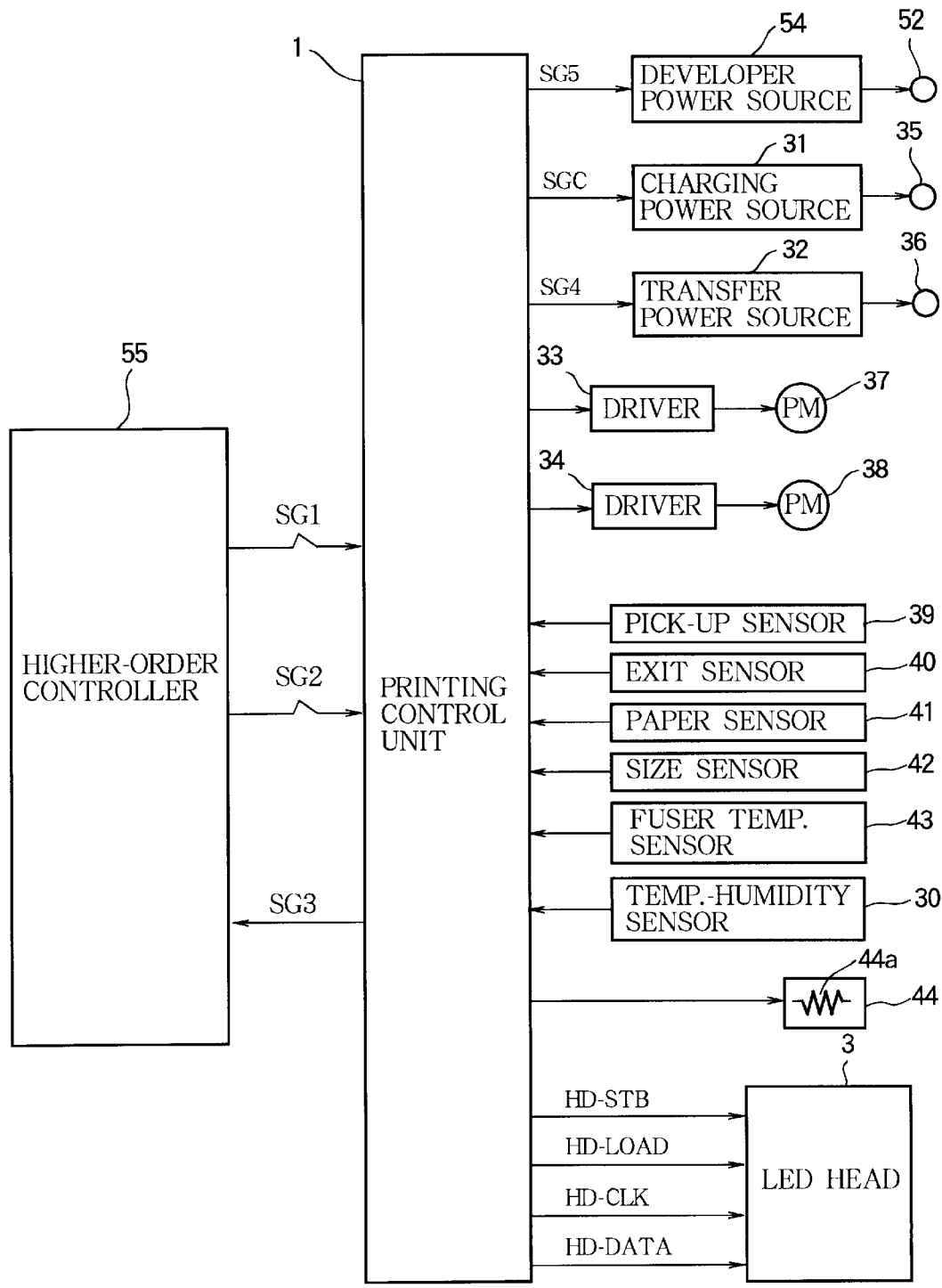
FIG. 2 is a block diagram illustrating the control system of a conventional electrophotographic printer.
Figure 3:
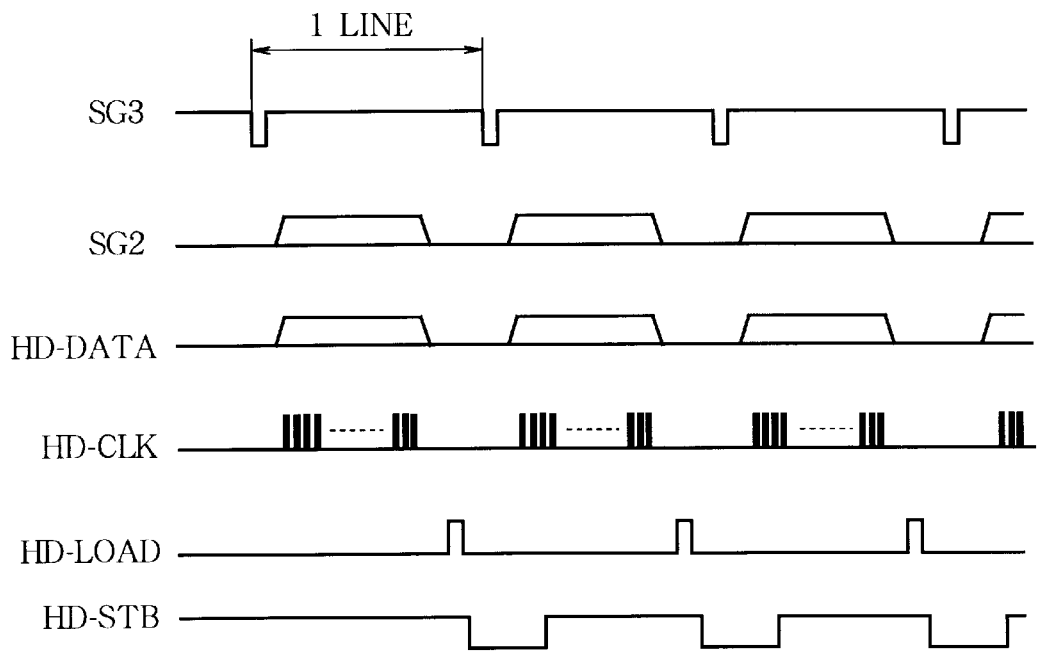
FIG. 3 is a timing diagram illustrating the operation of a conventional electrophotographic printer.
Figure 4:
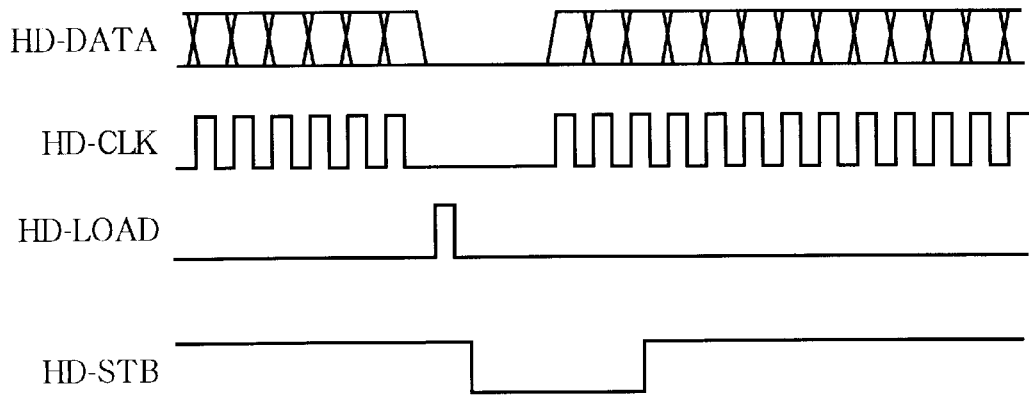
FIG. 4 is an enlarged timing diagram illustrating the signals supplied to an LED head.

Embodiments of the invention will be described with reference to the attached drawings, in which like parts are indicated by like reference characters. The embodiments are electrophotographic apparatus including a photosensitive member such as a photosensitive drum 51, developer 52, and other elements shown in FIGS. 1 and 2.

Figure 7:
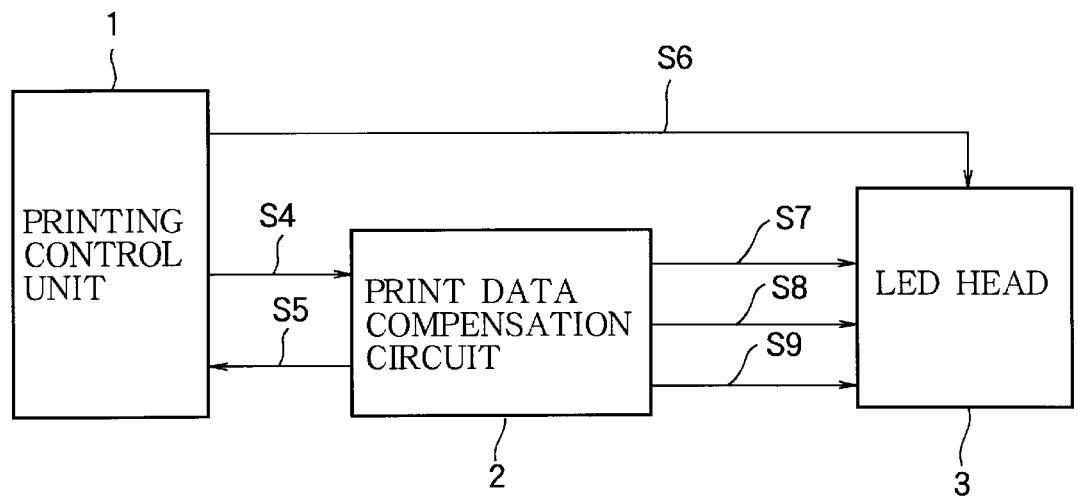
FIG. 7 is a block diagram showing the relevant parts of an LED printer according to a first embodiment of the invention.

The first embodiment is an electrophotographic printer having the overall circuit structure shown in FIG. 7. The printer comprises a printing control unit 1, a print data compensation circuit 2, and an LED head 3. The printing control unit 1 supplies a print data signal, also referred to below as a video signal S4, to the print data compensation circuit 2, and receives a print timing signal S5 from the print data compensation circuit 2. The print data compensation circuit 2 supplies a compensated print data signal S7, a transfer clock signal S8, and a latch signal S9 to the LED head 3. The LED head 3 receives the compensated print data signal S7 in synchronization with the transfer clock signal S8, and stores the compensated print data S7 in synchronization with the latch signal S9. The LED head 3 also receives a print driving signal or strobe signal S6 from the printing control unit 1.

Figure 8:
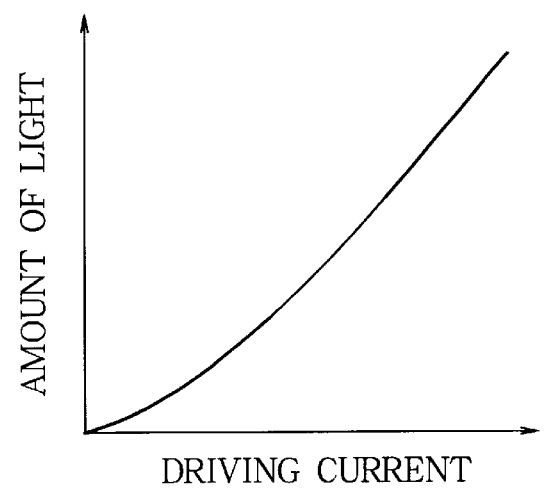
FIG. 8 is a graph showing the relation between driving current and the amount of light emitted by an LED.

The LED head 3 is of the gray-scale type that receives multiple bits of print data indicating the intensity or gray level of each pixel. In the following description, it will be assumed that there are four bits of print data per pixel. Depending on the input four-bit value, the LED head 3 generates varying amounts of driving current, yielding varying amounts of optical energy output. The relation between LED driving current and the amount of light emitted by the LED is substantially linear. FIG. 8 shows LED driving current on the horizontal axis and the amount of light emitted by the driven LED on the vertical axis. The optical energy output increases with the emitted amount of light.

Figure 9:
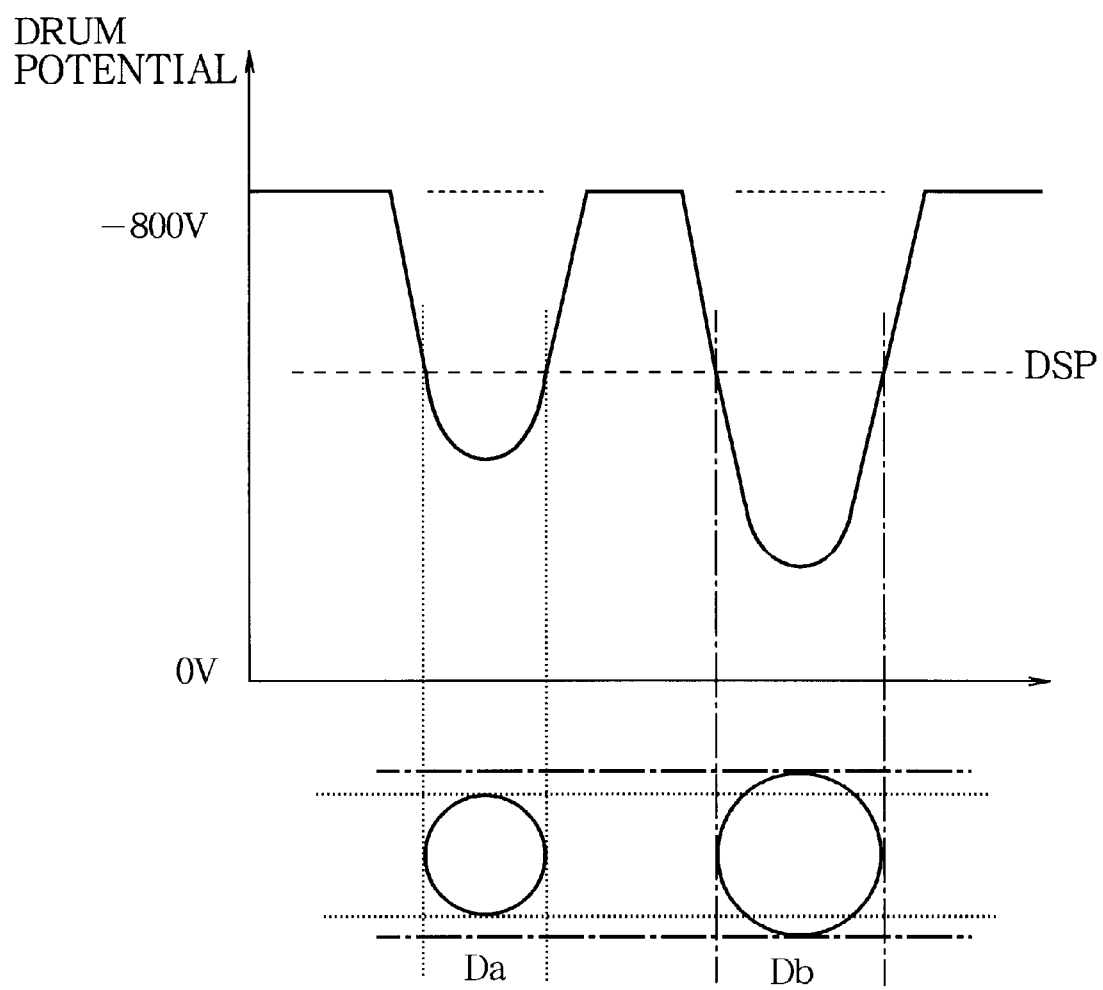
FIG. 9 is a graph illustrating the surface-potential profiles of two dots in an electrostatic latent image.

FIG. 9 illustrates the gray-scale operation in more detail by showing two toner dot images Da and Db and their potential profiles on the photosensitive drum 51. The horizontal direction in FIG. 9 corresponds to the longitudinal (axial) direction of the photosensitive drum 51. The vertical axis of the graph in the upper part of FIG. 9 indicates the surface potential of the photosensitive drum 51, dotted line DSP indicating the surface potential of a roller in the developer 52 that carries toner to the photosensitive drum.

When the input data value and thus the energy output are small, the emitted light forms an electrostatic latent image of a comparatively small dot, such as dot Da in FIG. 9, thereby creating a comparatively small dot in the toner image developed on the photosensitive drum 51 and the printed image transferred to the recording medium such as recording paper. When the input data value and thus the energy output are larger, the emitted light forms an electrostatic latent image of a comparatively larger dot, such as dot Db, thereby creating a comparatively larger dot in the toner image and printed image.

Since the size of a printed dot varies with the optical energy output by the corresponding LED, the printed dot size can be varied within a set range, in steps equivalent to an increment of one in the four-bit pixel-intensity data value, as described, for example, in Japanese Unexamined Patent Publication No. H7-246730.

The print data compensation circuit 2 modifies the print data received from the printing control unit 1 in order to drive the LEDs in the LED head 3 with the optimal driving current. If the compensated print data signal S7 is a four-bit signal, the standard output value of the LED head corresponds to, for example, an S7 value of '1000.' No LED driving current is produced when the S7 signal value is '0000.' The driving current increases as the S7 signal value increases from '0000' to '0001,' then to '0010,' and so on, maximum current being supplied when the S7 signal value is '1111.'

The LED head 3 may further modify the received print data S7 in order to compensate for differences between individual LEDs, for example, or for differences among the LED array chips making up the linear array of LEDs, arising from manufacturing-process variations.

Although the compensated print data signal S7 in this embodiment is a gray-scale signal with multiple bits per pixel, the video signal S4 need not be a gray-scale signal. In the following description, it will be assumed that the video signal S4 is a binary signal with only one bit per pixel. The one-bit value indicates whether the pixel is a high-intensity pixel (i.e., a black or other-colored pixel) or a low-intensity pixel (i.e., a white pixel, for which no toner dot is printed).

Figure 10:
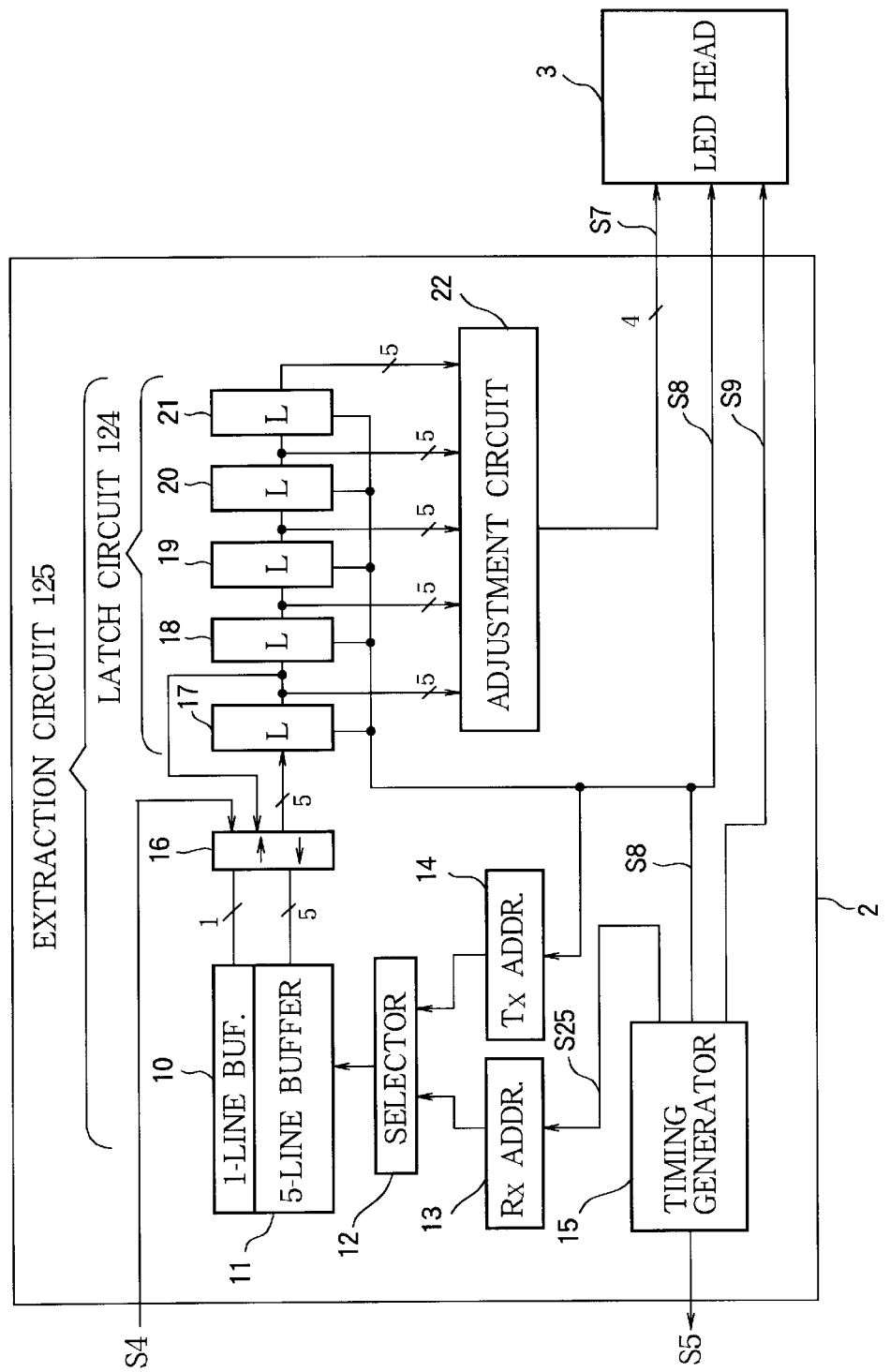
FIG. 10 is a more detailed block diagram of the print data compensation circuit in FIG. 7.

FIG. 10 shows an example of the internal structure of the print data compensation circuit 2. The component elements are a one-line buffer (Buf.) 10, a five-line buffer 11, a selector 12, a receiving address generator (Rx Addr.) 13, a transmitting address generator (Tx Addr.) 14, a timing generator 15, a column buffer 16, a latch unit 124 comprising five latch circuits (L) 17–21, and an adjustment circuit 22. The buffers 10, 11, 16, selector 12, address generators 13, 14, timing generator 15, and latch unit 124 form an extraction circuit 125 for extracting five-by-five blocks of pixel data. The column buffer 16 functions as a readout circuit.

The video signal S4 from the printing control unit 1 is received by the column buffer 16, input to the one-line buffer 10 one bit at a time, and transferred one entire line at a time to the five-line buffer 11. The five-line buffer 11 stores the most recently received five lines of print data contained in the video signal.

The five lines of print data stored in the five-line buffer 11 are transferred in parallel through the column buffer 16 into the latch circuits 17–21, the data for five vertically aligned pixels being transferred at once. These five bits of data first enter latch circuit 17, and are then shifted successively into latch circuits 18, 19, 20, 21. The latch circuits 17–21 collectively store data for a five-by-five block of pixels, disposed in five mutually adjacent rows and five mutually adjacent columns in the image.

The data stored in the latch circuits 17–21 are also output to the adjustment circuit 22. The adjustment circuit 22 thus receives data for a five-by-five block of pixels, on the basis of which the adjustment circuit 22 outputs compensated print data S7 for the single pixel disposed at the center of the block. The adjustment circuit 22 generates the compensated print data by, for example, comparing each input five-by-five pixel block with a set of prestored combinatorial patterns, also referred to below as matching patterns; deciding which matching pattern is matched by the input block; and outputting a prestored four-bit compensated value, according to which the LED head 3 drives the LED corresponding to the horizontal position of the pixel at the center of the five-by-five pixel block.

The receiving address generator 13 designates the locations in the five-line buffer 11 at which data input from the one-line buffer 10 are stored. The transmitting address generator 14 designates the locations in the five-line buffer 11 from which data are read out to the column buffer 16. The selector 12 selects either the output of the receiving address generator 13 or the output of the transmitting address generator 14, depending on whether the five-line buffer 11 is currently being written or read, and supplies the selected output address to the five-line buffer 11. The timing generator 15 generates timing signals and clock signals for the other elements in the print data compensation circuit 2. These signals include a receive clock signal S25 supplied to the receiving address generator 13, and the transfer clock signal S8 mentioned above, which is supplied to the transmitting address generator 14 and the latch circuits 17–25 as well as the LED head 3. The timing generator 15 also generates the latch signal S9 supplied to the LED head 3, and the timing signal S5 supplied to the printing control unit 1.

The first embodiment operates as follows.

When the printing mechanism 60 is ready, the printing control unit 1 sends the conventional timing signal SG3 to the higher-order controller 55, which responds by sending the printing control unit 1 a video signal SG2 with print data for one page. The printing control unit 1 transfers the print data to the print data compensation circuit 2 in the video signal S4.

In the print data compensation circuit 2, the timing generator 15 activates the receive clock signal S25 at the end of each received line of print data, causing the line to be transferred from the one-line buffer 10 to the five-line buffer 11 and stored in the five-line buffer at the addresses designated by the receiving address generator 13. The transferred line replaces the oldest line of data stored in the five-line buffer 11, so that the five-line buffer always stores the most recent five lines of data.

In synchronization with the transfer clock signal S8, the transmitting address generator 14 generates successive read addresses in the five-line buffer 11, each address enabling the column buffer 16 to read data for a column of five vertically aligned pixels. These data are shifted through the data latches 17–21; while residing in the data latches, the data are also supplied to the adjustment circuit 22. The adjustment circuit 22 thus receives data for successive five-by-five blocks of pixels centered at image positions that shift horizontally by one pixel at a time. The adjustment circuit 22 outputs four-bit compensated print data S7 for the center pixel in each block. These data are supplied to the LED head 3.

When the address generated by the transmitting address generator 14 reaches the end of a line, the reading of data from the five-line buffer 11 temporarily stops until the data for a new line have been transferred from the one-line buffer 10 to the five-line buffer 11; then the reading of data resumes, the transmitting address generator 14 starting over from the beginning of the line.

Next, the operation of the adjustment circuit 22 will be described in more detail. FIGS. 11A to 11H illustrate some of the matching patterns prestored in the adjustment circuit 22, and indicate the compensated four-bit print data output for each pattern. In each pattern, high-intensity pixels are indicated by circles (O) and low-intensity pixels by crosses (X). For the sake of simplicity, high-intensity pixels will also be referred to as black pixels and low-intensity pixels as white pixels, although the high-intensity pixels may actually have various colors other than black. The four-bit data value is the value output for the pixel at the center of each pattern.

Figure 11A:
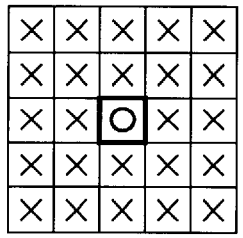
FIGS. 11A, 11B, 11C, 11D, 11E, 11F, 11G, and 11H illustrate compensated print data output for various matching patterns in the first embodiment.
Figure 11B:
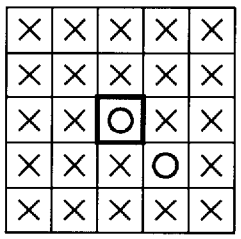
Figure 11C:
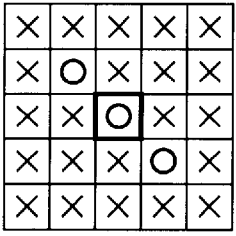
Figure 11D:
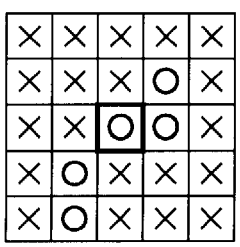
Figure 11E:
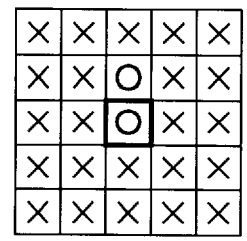
Figure 11F:
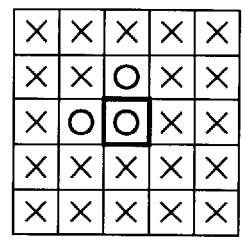
Figure 11G:
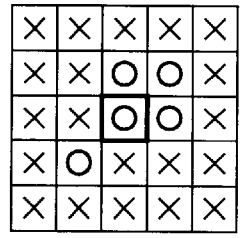
Figure 11H:
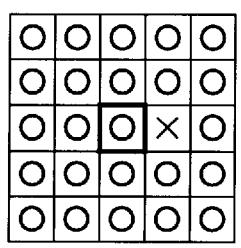

If, for example, the data received from the data latches 17–21 match the pattern shown in FIG. 11A, the adjustment circuit 22 outputs '1110' as a compensated print data value for the central pixel in this five-by-five pixel block.

As can be seen from FIGS. 11A to 11H, the compensated print data values have a general tendency to increase as the number of white pixels disposed around the central black pixel in the five-by-five block increases, but this tendency depends more on the values of the pixels relatively close to the central pixel than on the values of pixels farther from the central pixel. For example, the pattern in FIG. 11B yields a higher compensated print data value than the pattern in FIG. 11E, because although both patterns include twenty-three white pixels, in FIG. 11B all of the four pixels closest to (immediately above, below, right, and left of) the center position are all white, whereas in FIG. 11E only three of these four pixels are white.

To complete the five-by-five blocks of pixels centered at the first two pixel positions and the last two pixel positions in each line, for which incomplete data are received from the data latches 17–21, the adjustment circuit 22 assumes that the missing pixels are white. This assumption is made because the missing pixels correspond to positions in the left and right margins on the page, which are normally white. A similar assumption is made for missing pixels in the blocks centered on the first two and last two lines on each page, corresponding to positions in the top and bottom margins.

All of the prestored patterns have black pixels at the center position. The corresponding compensated print data for these patterns may range from '0001' to '1111.' If the central pixel is white, the compensated print data value is '0000.'

Figure 6:
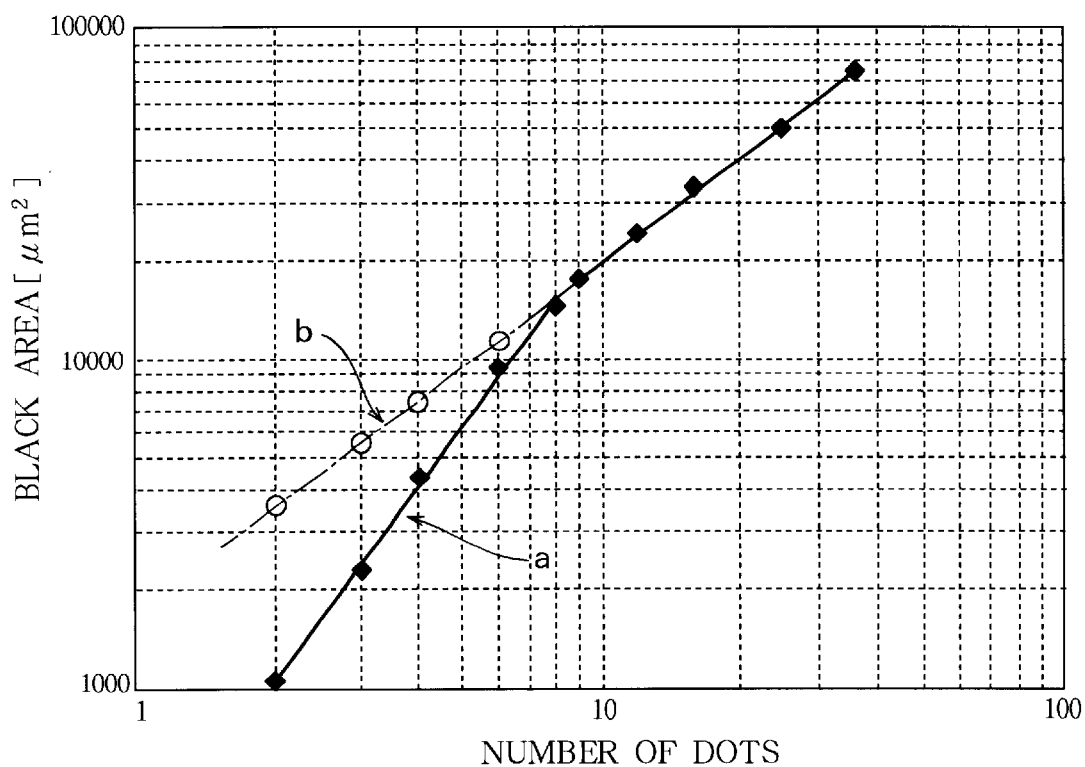
FIG. 6 is a graph illustrating the dependence of dot area on dot density.

The LED head 3 supplies sixteen levels of driving energy (current) to its component LEDs, corresponding to received data values from '0000' to '1111.' For comparatively high values such as '1111,' the output optical energy and the resulting toner dot are larger than the standard energy and dot size. This compensates for the tendency of the size of the toner dots transferred to the paper by the transfer unit 36 to decrease with decreasing dot density, as illustrated in FIG. 6. If appropriate matching patterns and compensated print data are stored in the adjustment circuit 22, the size of the transferred dots can be adjusted so that all transferred dots have substantially the intended uniform size, regardless of the dot density.

The adjustment is illustrated one-dimensionally in FIGS. 12A to 12D. FIG. 12A shows an example of a line of input print data including one isolated black pixel (X), two consecutive black pixels (Y), and three consecutive black pixels (Z). If vertically adjacent pixels are ignored, the adjustment circuit 22 adjusts the data for pixel X so that a comparatively large electrostatic latent dot image is formed on the photosensitive drum, as illustrated in FIG. 12B. The electrostatic latent images of the two consecutive dots Y are smaller, and the electrostatic latent images of the three consecutive dots Z are smaller still. When these electrostatic latent images are developed and transferred to paper, however, the toner dots formed on the paper are all of substantially identical size, as illustrated in FIG. 12C. FIG. 12D illustrates the similar adjustment for three vertically contiguous dots.

As FIGS. 12B and 12C show, the toner dot transferred to the paper is always smaller than the corresponding electrostatic latent dot image formed on the photosensitive drum, but whereas the size of a transferred dot surrounded by neighboring dots is only slightly smaller than the latent image size, the size of an isolated transferred dot is much smaller than the latent image size. With a conventional LED head, which supplies uniform optical energy for all dots, fine lines and small print have a tendency to become faint when transferred to paper. By adjusting the print data to increase the size of comparatively isolated dots, the present embodiment corrects this tendency so that fine lines and small print are printed with the full intended size, improving the quality of the printed image.

Although the first embodiment has been described as using five-by-five matching patterns, it is possible to use M×N matching patterns, where M and N are arbitrary positive integers (e.g., odd integers greater than one), by providing an N-line buffer and M data latches in the adjustment circuit 22.

Although the first embodiment compensates for the dependency of transferred dot size on dot density, the transferred dot size also depends on environmental conditions such as temperature and humidity inside the printer. Specifically, as the temperature and humidity increase, the paper tends to absorb more moisture, and its electrical resistance decreases correspondingly. Other factors (such as transfer voltage, driving current, and driving time) being equal, the reduced electrical resistance leads to more efficient toner transfer than under low-temperature, low-humidity conditions.

Figure 13:
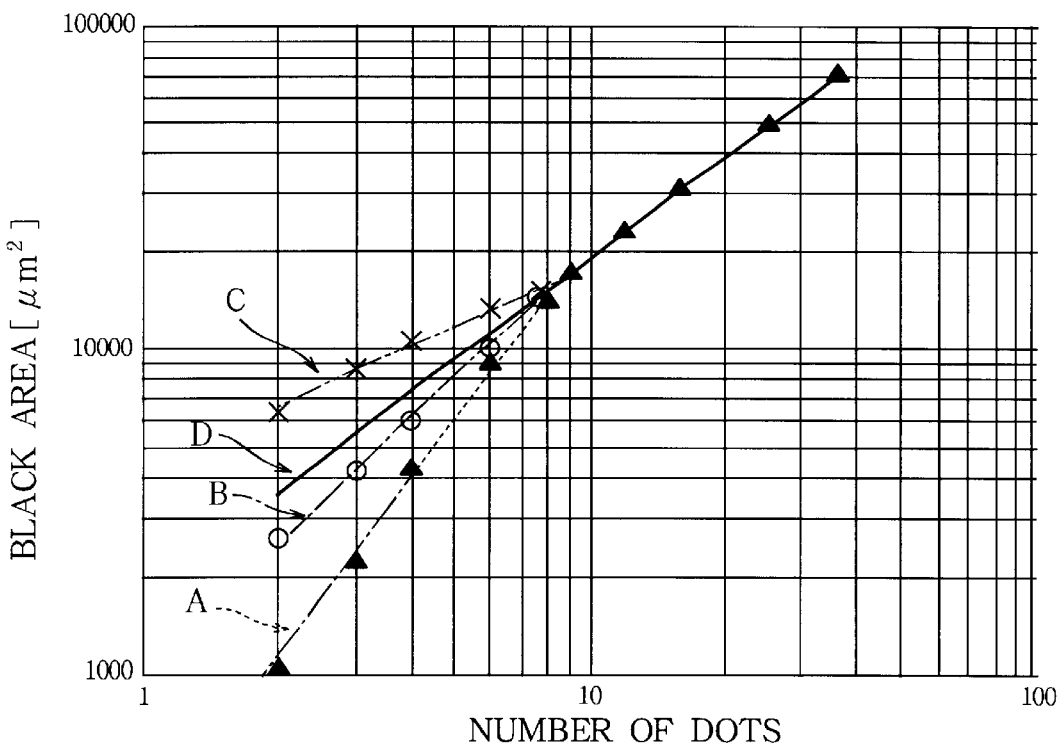
FIG. 13 illustrates the dependence of dot area on dot density for normal conditions and high temperature and humidity conditions, and resulting overcompensation.

FIG. 13 illustrates this environmental effect. The horizontal and vertical axes have the same meaning as in FIG. 6. Characteristic A, which is identical to characteristic 'a' in FIG. 6, shows the tendency of dot size (black area) to decrease with decreasing dot density under normal temperature and humidity conditions. Under high temperature and humidity conditions, the decrease in dot size is considerably less, as illustrated by characteristic B. Thus an adjustment that yields the correct dot size under normal conditions, by shifting characteristic A to characteristic D, will overcompensate under high temperature and humidity conditions by shifting characteristic B to characteristic C, so that the dots in low-density image areas are larger than intended.

Figure 14:
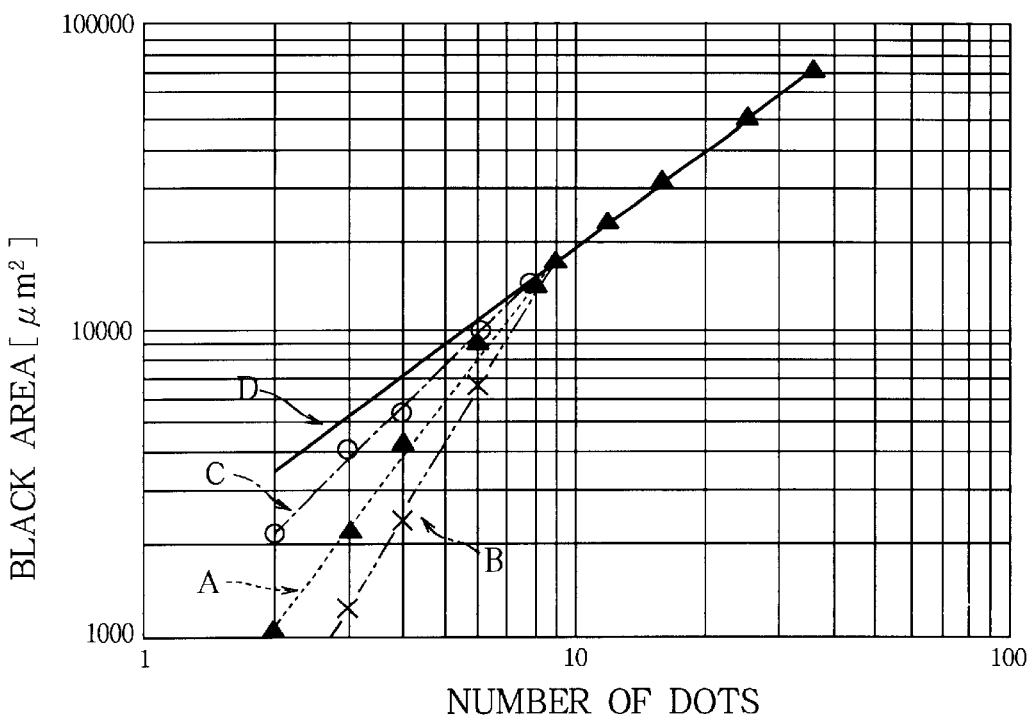
FIG. 14 illustrates the dependence of dot area on dot density for normal conditions and low temperature and humidity conditions, and resulting undercompensation.

FIG. 14 illustrates the effect of abnormally low temperature and humidity. Characteristic A again indicates the density dependence of dot size (black area) under normal temperature and humidity conditions. Under low temperature and humidity conditions, the dependence becomes stronger; dot size decreases more sharply as the dot density is decreased. Thus an adjustment that corrects characteristic A to characteristic D under normal conditions undercompensates under low temperature and humidity conditions, so that characteristic B is only corrected to characteristic C, and low-density dots are still printed too small.

Figure 15:
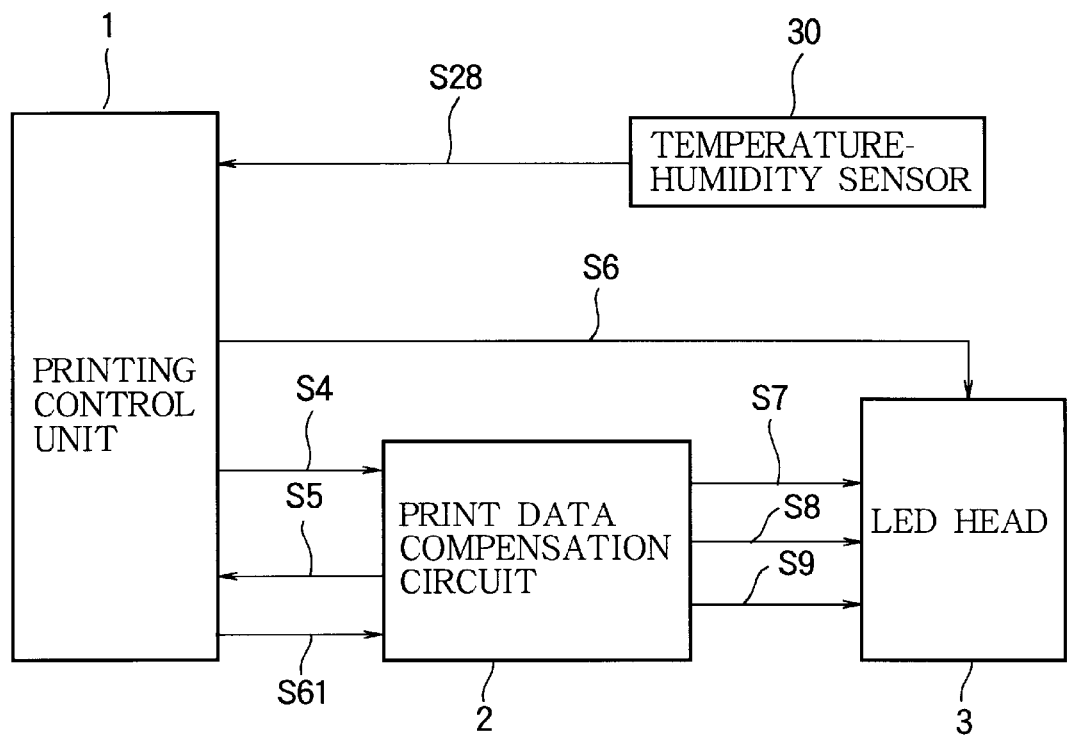
FIG. 15 is a block diagram showing the relevant parts of an LED printer according to a second embodiment of the invention.

Referring now to FIG. 15, a second embodiment of the invention adds a temperature-humidity sensor 30 to the structure shown in FIG. 7. The temperature-humidity sensor 30 sends an environmental data signal S28, indicating ambient temperature and humidity conditions, to the printing control unit 1, as in the conventional electrophotographic printer shown in FIG. 1. On the basis of this information, the printing control unit 1 sends the print data compensation circuit 2 an environmental signal S61 having three possible values, indicating whether the ambient temperature and humidity conditions are high, normal, or low.

Figure 16:
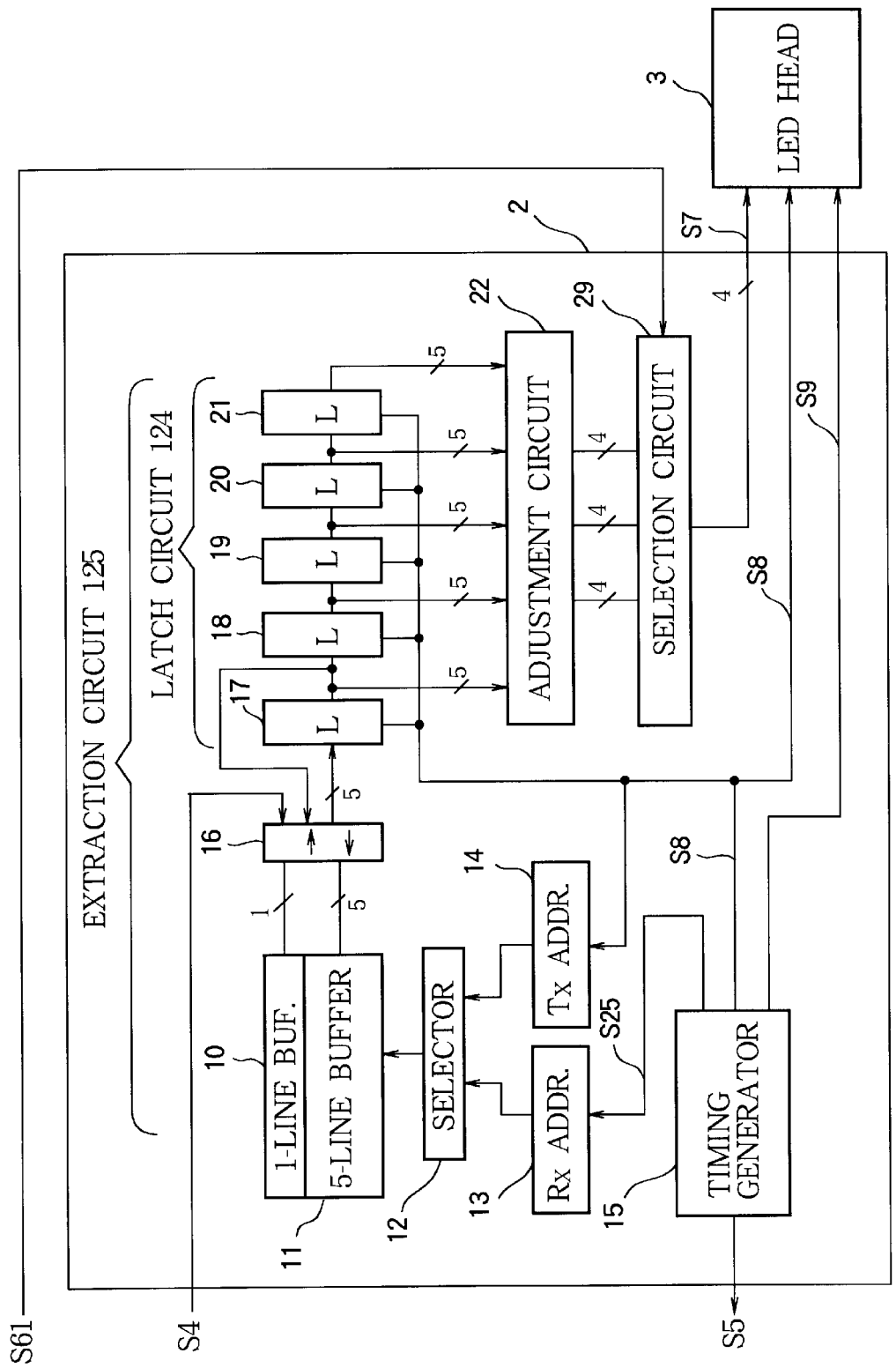
FIG. 16 is a more detailed block diagram of the print data compensation circuit in FIG. 15.
Figure 17A:
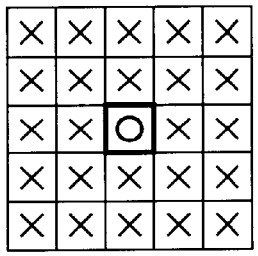
FIGS. 17A, 17B, 17C, 17D, 17E, 17F, 17G, and 17H illustrate compensated print data output for various matching patterns in the second embodiment.
Figure 17E:
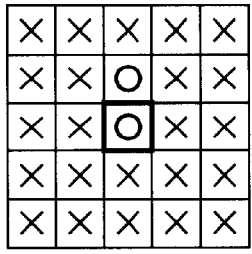
Figure 17B:
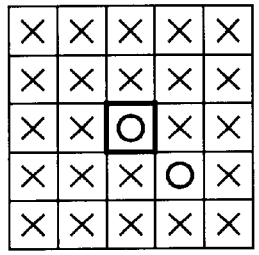
Figure 17F:
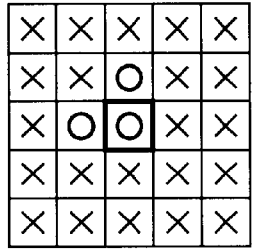
Figure 17C:
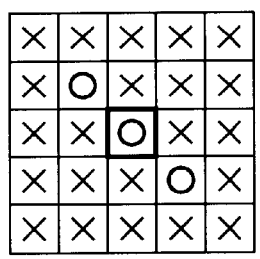
Figure 17G:
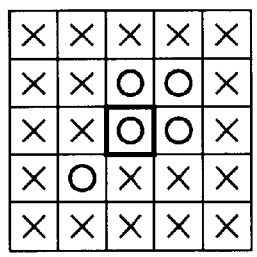
Figure 17D:
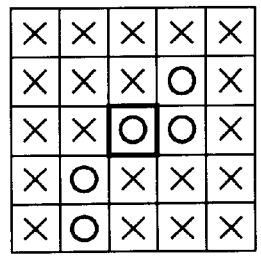
Figure 17H:
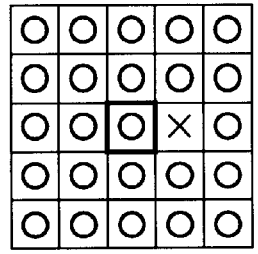

The print data compensation circuit 2 in this embodiment has, for example, the internal structure shown in FIG. 16, adding a selection circuit 29 to the structure shown in the first embodiment. The selection circuit 29 receives the environmental data signal S61. The adjustment circuit 22 now stores three compensated print data values for each matching pattern, the three values being suitable for low, normal, and high temperature and humidity conditions, respectively. Upon receiving a five-by-five block of pixel data from the latch circuits 17–21, the adjustment circuit 22 sends all three data values for the corresponding matching pattern to the selection circuit 29. The selection circuit 29 selects one of the three values according to the environmental data signal S61; the selected value becomes the compensated print data signal S7 supplied to the LED head 3.

Examples of the three values A, B, C stored for various matching patterns are shown in FIGS. 17A to 17H. Value A is suitable for high temperature and humidity conditions, value B for normal temperature and humidity conditions, and value C for low temperature and humidity conditions. Taking the matching pattern in FIG. 17A as an example, the selected value is '1101' (value A) under high temperature and humidity conditions, '1110' (value B) under normal temperature and humidity conditions, and '1111' (value C) under low temperature and humidity conditions. (Analogous descriptions of FIGS. 17B to 17H will be omitted.)

By providing a selection of compensated print data values for different environmental conditions, the second embodiment avoids the type of overcompensation illustrated in FIG. 13 and undercompensation illustrated in FIG. 14. The size of the transferred toner dots depends neither on the dot density nor on the ambient temperature and humidity, so a uniformly high printing quality is maintained under all environmental conditions.

In a variation of the preceding embodiments, the adjustment circuit 22 calculates the compensated print data values as a weighted sum of the values of the pixels in the pixel block received from the data latches, instead of comparing the received pixel block with prestored matching patterns. In this variation, the adjustment circuit 22 need store only a comparatively small number of weighting coefficients, instead of a larger number of matching patterns, and can generate the compensated print data by a simple multiply-accumulate operation, instead of a pattern matching operation.

Next, a third embodiment will be described. The third embodiment has a hardware structure similar to that of the first embodiment, shown in FIGS. 7 and 10, but differs in that the LED head 3 does not have a gray-scale capability, and the compensated print data are binary data, each pixel being represented by a one-bit value indicating whether the corresponding LED is to be driven or not.

The adjustment circuit 22 in the print data compensation circuit 2 in the third embodiment adjusts the print data by adding additional dots to isolated groups of dots. For example, when the print data compensation circuit 2 recognizes an isolated group of one, two, or three black pixels, it adds two more black pixels to the group, by changing two adjacent pixels from white to black. Similarly, when the print data compensation circuit 2 recognizes an isolated group of one, two, or three white pixels, it adds two more white pixels to the group, by changing two adjacent pixels from black to white.

Like the adjustment circuit 22 in the first embodiment, the adjustment circuit 22 in the third embodiment receives a five-by-five pixel block from the data latches 17–21. Table 1 summarizes the operation of the adjustment circuit 22 by showing the number of black pixels in the block, the number of black pixels added or deducted by the adjustment circuit 22, and the resulting number of black pixels in the output block.

TABLE 1

| Number of black pixels in five-by-five block | | |
|---|---|---|
| Input | Change | Output |
| 1 black pixel | +2 | 3 black pixels |
| 2 black pixels | +2 | 4 black pixels |
| 3 black pixels | +2 | 5 black pixels |
| 4 black pixels | +1 | 5 black pixels |
| 5 black pixels | +1 | 6 black pixels |
| 6 black pixels | +1 | 7 black pixels |
| 7 black pixels | +1 | 8 black pixels |
| 8 black pixels | 0 | 8 black pixels |
| 9 black pixels | 0 | 9 black pixels |
| 10 black pixels | 0 | 10 black pixels |
| . | . | . |
| . | . | . |
| . | . | . |
| 15 black pixels | 0 | 15 black pixels |
| 16 black pixels | 0 | 16 black pixels |
| 17 black pixels | 0 | 17 black pixels |
| 18 black pixels | −1 | 17 black pixels |
| 19 black pixels | −1 | 18 black pixels |
| 20 black pixels | −1 | 19 black pixels |
| 21 black pixels | −1 | 20 black pixels |
| 22 black pixels | −2 | 20 black pixels |
| 23 black pixels | −2 | 21 black pixels |
| 24 black pixels | −2 | 22 black pixels |

The changes in Table 1 are performed by adding one or two black pixels at positions adjacent to an isolated contiguous group of one to seven black pixels in a five-by-five block, or by deleting one or two black pixels at positions adjacent to an isolated contiguous group of one to seven white pixels, where contiguous means horizontally, vertically, or diagonally contiguous. No pixel values are changed when all the pixels in the five-by-five block are black, or all are white.

In the description that follows, when the five-by-five pixel block stored in the latch circuits 17–21 matches one of the prestored matching patterns, the pixel at the center of the block is changed. The block stored in the latch circuits shifts in both the row and column directions. First, the block shifts horizontally from the first column to the last column, staying in the same five rows; then it moves down one row, returns to the first column position, and begins shifting horizontally again. As the block moves in this way, each pixel block occupies the center of the block just once, at which time the pixel may be changed from black to white or from white to black if the surrounding pixels match one of the matching patterns. As this process is repeated, an isolated black or white pixel acquires a certain number of neighboring black or white pixels in predetermined relative positions.

The process of adding two black pixel to a single isolated black pixel located in column M, row N+1, will be illustrated below as an example.

Figure 18:
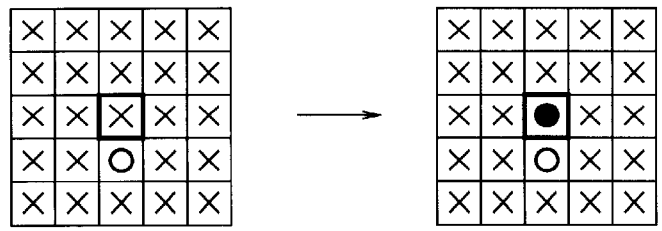
FIG. 18 illustrates the alteration of print data according to a first matching pattern in a third embodiment of the invention.
Figure 19:
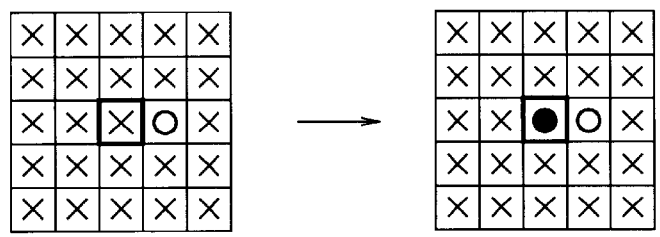
FIG. 19 illustrates the alteration of print data according to a second matching pattern in the third embodiment.

One of the matching patterns stored in the adjustment circuit 22 (pattern a-1, illustrated in FIG. 18) changes the central pixel in a five-by-five pixel block from white to black if that pixel is disposed immediately above an isolated black pixel, all other pixels in the block being white. Another matching pattern stored in the adjustment circuit 22 (pattern a-2, illustrated in FIG. 19) changes the central pixel from white to black if that pixel is disposed immediately to the left of an isolated black pixel, all other pixels in the block being white. In these and the following drawings, an X indicates a white pixel, a white circle indicates a pixel that was originally black and remains black, and a black circle indicates a pixel that has been changed from white to black.

Figures 20A, 20B, 20C:
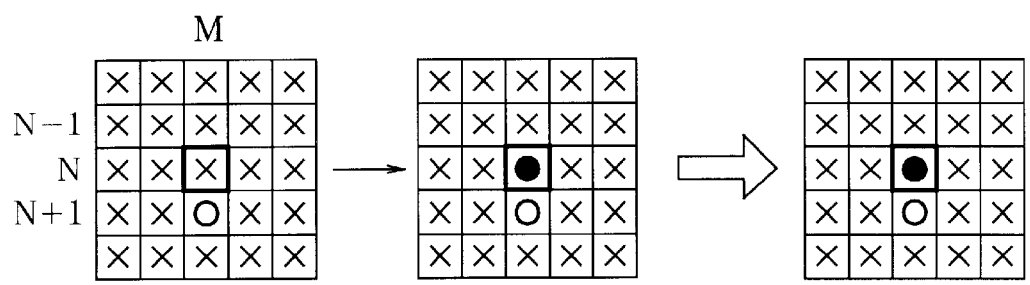
FIGS. 20A, 20B, and 20C illustrate the effect of the alteration of print data according to the first matching pattern in the third embodiment.

As a result of matching pattern a-1, the pixel in column M, row N (the central pixel in FIG. 20A) is changed from white to black, as indicated in FIG. 20B. Accordingly, after the change in FIG. 20B, there are two black pixels in the five-by-five block, as shown in FIG. 20C. This change is reflected in the compensated print data output to the LED head 3, but does not alter the data stored in the five-line buffer 11 or the latch circuits 17–21.

Figures 21A, 21B, 21C:
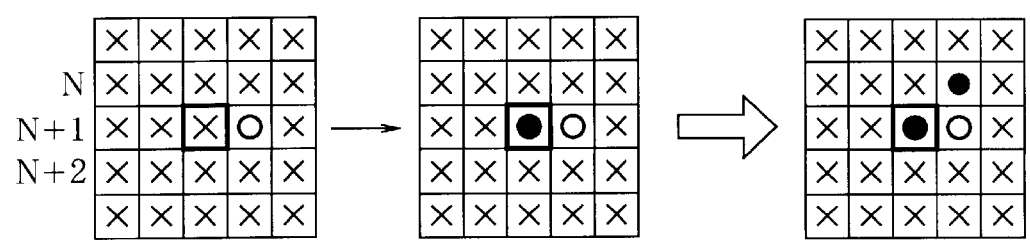
FIGS. 21A, 21B, and 21C illustrate the combined effect of the alteration of print data according to the first and second matching patterns in the third embodiment.

As a result of matching pattern a-2, the pixel in column M−1, row N+1 (the central pixel in FIG. 21A) is also changed from white to black, as indicated in FIG. 21B. As a result of this further change, the original isolated black pixel has become a group of three black pixels, as shown in FIG. 21C, in the compensated print data S7 supplied to the LED head 3.

Figure 22:
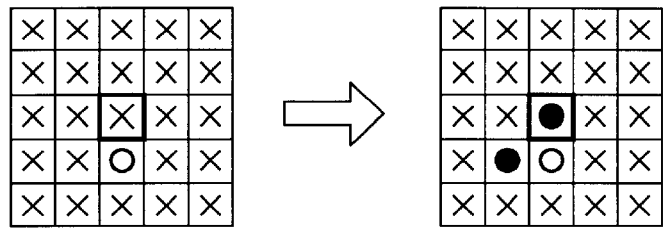
FIG. 22 illustrates this combined effect of the third embodiment in a standardized form.
Figure 23:
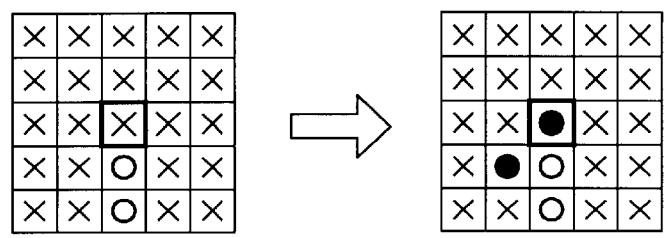
FIGS. 23, 24, 25, 26, 27, and 28 illustrate the enlargement of various groups of black pixels in the third embodiment.
Figure 24:
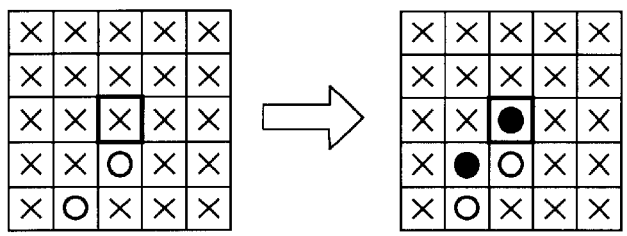
Figure 25:
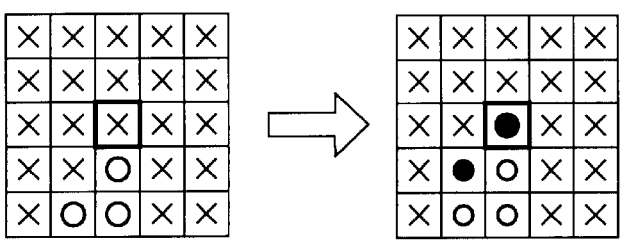
Figure 26:
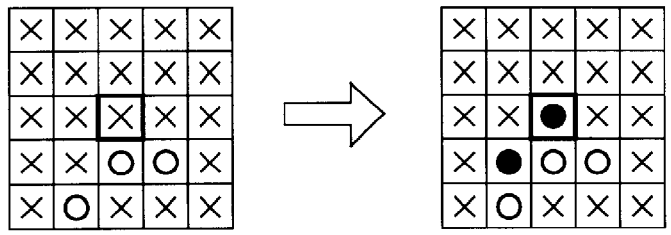
Figure 27:
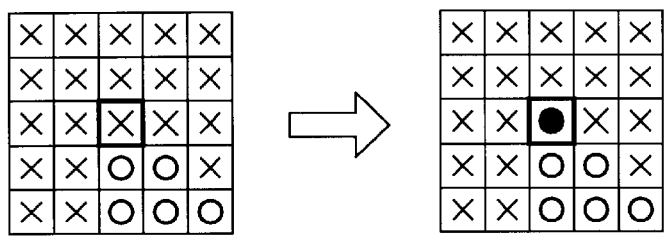
Figure 28:
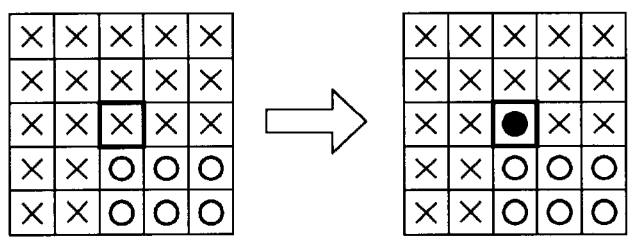
Figure 29:
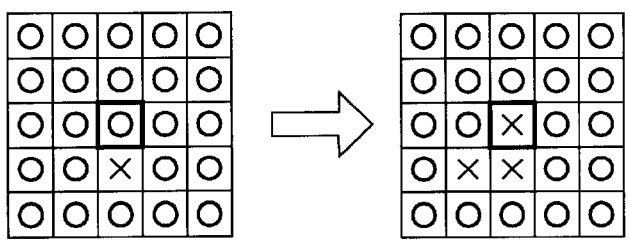
FIG. 29 illustrates the enlargement of a white pixel to a group of three white pixels in the third embodiment.

FIG. 22 illustrates the process of adding two black pixels to a single isolated black pixel in a standardized form, with the first pixel to be changed disposed at the center of the block. Using this standardized form, FIGS. 23, 24, 25, and 26 illustrate patterns that result in the addition of two black pixels to a group of two or three black pixels. FIGS. 27 and 28 illustrate patterns that add one black pixel to a group of five or six black pixels. FIG. 29 illustrates a pattern that adds two white pixels to an isolated white pixel.

Experiments performed by the inventors have shown that it is preferable to enlarge isolated groups of pixels by adding the numbers of pixels given in Table 1, even though the resulting pixel arrangements may be asymmetrical, as illustrated in FIGS. 22 to 29. If, for example, a single isolated black pixel were to be enlarged to a group of five pixels by adding black pixels symmetrically above, below, and to the right and left of the isolated pixel, the resulting printed dot would be larger than intended.

Although the third embodiment does not adjust the sizes of individual dots, by adjusting the number of black dots in a contiguous group according to the size of the group, and adjusting the number of white dots in a contiguous group according to the size of the group, it achieves substantially the same effect as the first embodiment. That is, despite the tendency of the transfer unit 36 to transfer less toner from the photosensitive drum 51 to the paper 53 when a black pixel has relatively few neighboring black pixels, the total size of the black area produced by the compensated print data in the third embodiment is approximately proportional to the number of black pixels in the original print data S4, generally following characteristic 'b' rather than characteristic 'a' in FIG. 6.

The positions at which black and white pixels are added to isolated groups are not restricted to those shown in FIGS. 22 to 29. The same effect can be obtained by adding pixels at different positions, provided the number of pixels added conforms to Table 1.

Next, a fourth embodiment will be described. The fourth embodiment combines features of the first and third embodiments.

Like the first embodiment, the fourth embodiment employs an LED head 3 with a gray-scale capability, and adjusts the sizes of individual black dots according to the number and proximity of neighboring black dots. Like the third embodiment, the fourth embodiment also increases the number of dots in a small isolated group of black or white dots.

The fourth embodiment has the same hardware structure as the first embodiment, shown in FIGS. 7 and 10, but differs with regard to the operation of the adjustment circuit 22. The operation will be described through several examples below.

When the adjustment circuit 22 in the fourth embodiment recognizes a single isolated black pixel as in FIG. 30A, it adds four more black pixels at the vertically and horizontally adjacent positions, as shown in FIG. 30B. In the compensated print data for the resulting group of five black pixels, the original black pixel has the value '1110' (value A in FIG. 30C), so more than the standard amount of driving current is supplied to the corresponding LED, as in the first embodiment. The compensated values of the four added pixels are '0100' (value B in FIG. 30C), resulting in less than the standard amount of driving current. The notations +6 and −4 in FIG. 30C represent the algebraic difference between the supplied driving current and the standard amount, in units equivalent to the least significant bit of the compensated print data.

Similarly, an isolated group of two vertically adjacent black pixels, as in FIG. 31A, is given two additional black pixels, as in FIG. 31B, the original black pixels having compensated data values of '1101' (five units above the standard value) and the additional black pixels having compensated data values of '0101' (three units below the standard value), as indicated in FIG. 31C.

An isolated group of two diagonally adjacent black pixels, as shown in FIG. 32A, is also given two additional black pixels, as shown in FIG. 32B, the original black pixels again having compensated data values of '1101' and the additional black pixels now having compensated data values of '0110' (two units below the standard value), as indicated in FIG. 32C.

An isolated white pixel, as shown in FIG. 33A, remains isolated, as shown in FIG. 33B, but the data values of the four horizontally and vertically adjacent black pixels are reduced by four units (from '1000' to '0100'), as indicated by the letter A in FIG. 33C. That is, the size of the four adjacent black dots is reduced, to increase the visibility of the printed white dot. The white pixel itself (C) remains white ('0000'), and the other surrounding black pixels (B) retain the standard black level ('1000') in the compensated print data.

As these four patterns show, the fourth embodiment enables compensation to be applied more symmetrically than in the third embodiment. In the printed image, fine detail is faithfully aligned, and small fonts are printed with the appearance intended by the font designer.

In addition, the amount of toner transferred from the photosensitive drum 51 to the paper can be adjusted more precisely than in any of the preceding embodiments, since the data values of both the pixel of interest and its adjoining pixels are adjusted.

For example, in the third embodiment, isolated groups of both three and four black or white pixels were enlarged to groups of five black or white pixels, causing different input data to produce substantially the same compensated effect. In the fourth embodiment, the data values of the added pixels can be adjusted so that different input data always produce different compensated effects.

The precision of the compensation applied in the first embodiment is directly limited by the coarseness of the gray scale of the LED head 3 (the difference between adjacent gray levels). This precision could be increased only by increasing the number of bits of data per pixel, a costly undertaking involving extensive circuit redesign of the LED head. In the fourth embodiment, however, the precision of the compensation is not directly limited by the coarseness of the gray scale, since additional precision can be obtained by adjusting the data values of adjoining pixels, and this additional precision is obtained by altering only the internal logic of the adjustment circuit 22, which can be done relatively inexpensively.

The fourth embodiment is thus capable of reproducing fine lines, small print, and other fine detail with very high quality and fidelity at a comparatively low cost.

Figure 34:
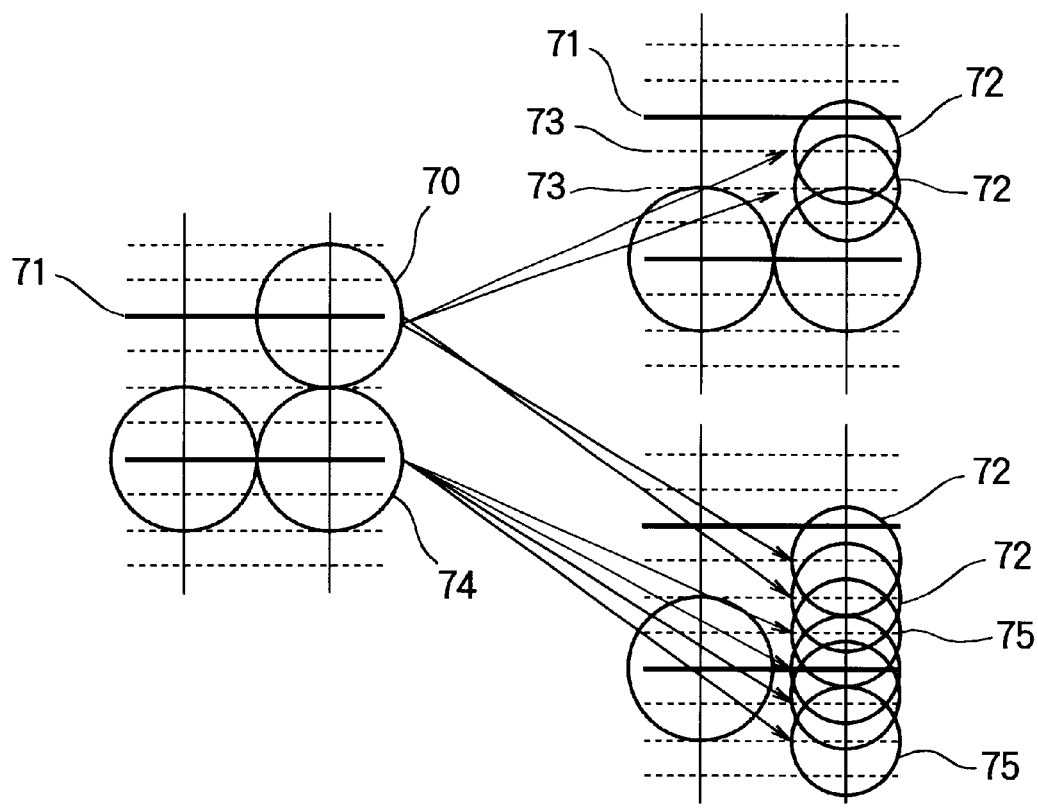
FIG. 34 illustrates a variation of the fourth embodiment.

In a variation of the fourth embodiment, the added pixels are divided into sub-pixels and are vertically offset by being formed on sub-raster lines. Referring to FIG. 34, when a pixel 70 is added immediately above an isolated pixel 74, instead of being centered on the normal raster line 71, the added pixel is divided into two overlapping sub-pixels 72, which are centered on two sub-raster lines 73 disposed below the normal raster line 71. In this case, the isolated pixel 74 may also be subdivided into, for example, four sub-pixels 75, which are centered on respective raster and sub-raster lines. The use of sub-raster lines provides a further capability for fine-tuning the size of dots, lines, and other fine detail in the printed image.

In another variation of the fourth embodiment, a temperature and humidity sensor is added as in the second embodiment, and different print data are supplied to the LED head 3, depending on ambient temperature and humidity conditions.

Figure 5:
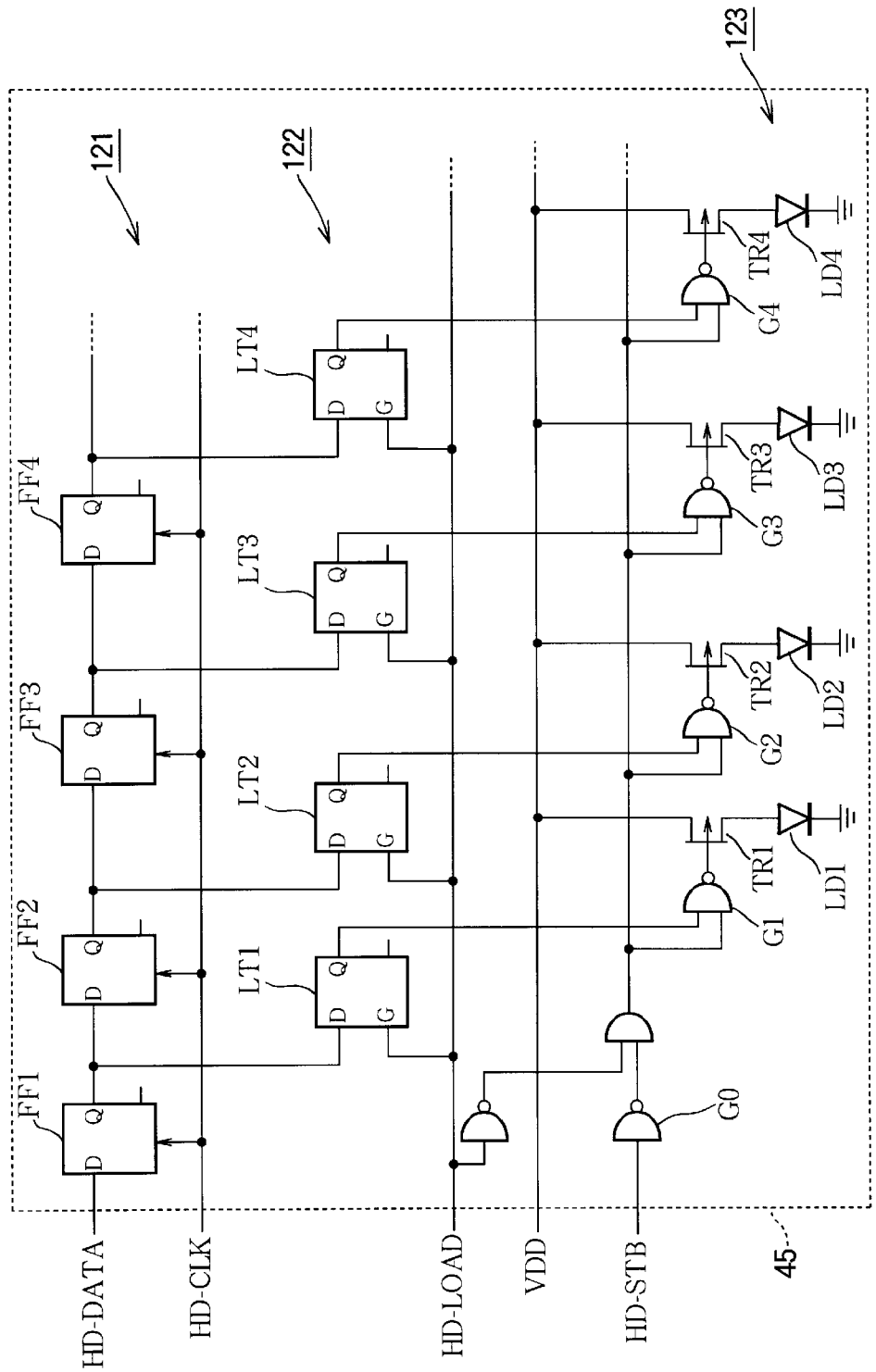
FIG. 5 is a circuit diagram of an LED head.

In a variation of any of the preceding embodiments, the LEDs in the LED head are divided into a certain number 'a' of groups. If the LEDs are numbered in their order of position in the linear array, the first group, denoted group zero, includes the first LED (LED 0, equivalent to LD1 in FIG. 5), and every a-th subsequent LED. Similarly, the second group (group one) includes the second LED (LED 1, equivalent to LD2 in FIG. 5) and every a-th subsequent LED. The composition of the groups is summarized in Table 2.

TABLE 2

Grouping of LEDs

| Group | LEDs |
| --- | --- |
| 0 | 0, a, 2a, 3a, . . . |
| 1 | 1, a + 1, 2a + 1, 3a + 1, . . . |
| 2 | 2, a + 2, 2a + 2, 3a + 2, . . . |
| . | . |
| . | . |
| . | . |
| a − 1 | (a − 1), a + (a − 1), 2a + (a − 1), 3a + (a − 1), . . . |

In this variation, the LED head 3 is first supplied with compensated print data for group zero, and the LEDs in group zero are driven according to the supplied data. Next, compensated print data for the LEDs in group one are supplied, and those LEDs are driven. Operation continues in this way until the LEDs in group (a-1) have been driven, completing the formation of one line of pixels in the electrostatic latent image; then the same operation repeats from group zero to form the next line of pixels. The output order of the compensated print data can be rearranged in this way by providing the print data compensation circuit 2 with extra buffer memory for the output values. The advantage of this scheme is that it avoids the excessive current flow associated with the simultaneous driving of a large number of LEDs.

The invention has been described in relation to a monochrome printer, but can also be practiced in a color printer. In this case, the terms 'black' and 'white' in the foregoing description should be replaced by 'high-intensity' and 'low-intensity,' respectively.

The invention is applicable not only to LED printers but to other types of electrophotographic apparatus as well, including facsimile machines and digital copiers. The light-emitting elements need not be LEDs; other types of light-emitting elements may be employed.

The invention can also be practiced in non-electrophotographic types of image-recording apparatus, such as thermal printers, in which an image is formed by supplying various amounts of driving current to an array of resistive heat-emitting elements.

The data received by the compensation circuit are not restricted to one bit per pixel. The compensation circuit may receive gray-scale data with multiple bits per pixel, so that a pixel can have a range of intensity levels. In this context, the term 'low-intensity' as used herein refers to the minimum intensity level, and 'high-intensity' refers to any other intensity level.

Those skilled in the art will recognize that further variations are possible within the scope claimed below.

What is claimed is:

1. A method of recording an image, comprising the steps of:
   supplying driving energy to driven elements according to pixel data indicating pixel intensities;
   adjusting the driving energy supplied to form a high-intensity pixel according to intensities of pixels near the high-intensity pixel;
   sensing ambient temperature and/or humidity conditions; and
   adjusting the driving energy supplied to form said high-intensity pixel according to the ambient temperature and/or humidity conditions.

2. An image recording apparatus, comprising:
   driven elements supplied with driving energy according to pixel data indicating pixel intensities to form an image, including an adjustment circuit adjusting the driving energy supplied to form a high-intensity pixel according to intensities of pixels near the high-intensity pixel; and
   a sensor for sensing ambient temperature and/or humidity conditions, wherein the adjustment circuit adjusts the driving energy supplied to form said high-intensity pixel according to the ambient temperature and/or humidity conditions.

3. An image recording apparatus, comprising:
   a first array of driven elements;
   a second array of driving elements supplying energy to drive respective driven elements in the first array according to pixel data indicating pixel intensities, thereby recording an image;
   a compensation circuit for adjusting the driving energy supplied by each driving element in the second array, the compensation circuit including an adjustment circuit for adjusting the driving energy supplied to form a high-intensity pixel according to intensities of pixels near the high-intensity pixel; and a sensor for sensing ambient temperature and/or humidity conditions, wherein:

the data indicating pixel intensities are supplied sequentially, one line at a time;

the compensation circuit also includes an extraction circuit for extracting pixel data for an M×N pixel block with N columns of pixels in M lines, M and N being positive integers;

the adjustment circuit adjusts the driving energy supplied to form a central pixel in the M×N pixel block, if the central pixel is a high-intensity pixel, according to the intensities of the pixels disposed around the central pixel in the M×N pixel block;

the adjustment circuit prestores a plurality of combinatorial patterns of pixel intensities, prestores compensated data values corresponding to the plurality of combinatorial patterns, compares the M×N pixel block with the plurality of combinatorial patterns, and outputs the compensated data value of a combinatorial pattern matching the M×N pixel block; and the adjustment circuit outputs a plurality of compensation values corresponding to each of the combinatorial patterns, and has a selection circuit for selecting one of the plurality of compensation values according to the sensed ambient temperature and/or humidity conditions.

4. A method of recording an image, comprising the steps of:

supplying driving energy to driven elements according to pixel data indicating pixel intensities;

altering the pixel data to change a low-intensity pixel to a high-intensity pixel, thereby enlarging a contiguous group of high-intensity pixels, if the low-intensity pixel is surrounded by a predetermined pattern of pixel intensities; and altering the pixel data to change a high-intensity pixel to a low-intensity pixel, thereby enlarging a contiguous group of low-intensity pixels, if the high-intensity pixel is surrounded by another predetermined pattern of pixel intensities.

5. A method of recording an image, comprising the steps of:

supplying driving energy to driven elements according to pixel data indicating pixel intensities; and altering the pixel data to change a low-intensity pixel to a high-intensity pixel, thereby enlarging a contiguous group of high-intensity pixels, if the low-intensity pixel is surrounded by a predetermined pattern of pixel intensities;

wherein the low-intensity pixel changed to a high-intensity pixel is given different intensity levels depending on the surrounding pattern of pixel intensities.

6. A method of recording an image, comprising the steps of:

supplying driving energy to driven elements according to pixel data indicating pixel intensities;

altering the pixel data to change a low-intensity pixel to a high-intensity pixel, thereby enlarging a contiguous group of high-intensity pixels, if the low-intensity pixel is surrounded by a predetermined pattern of pixel intensities;

sensing ambient temperature and/or humidity conditions; and adjusting said driving energy according to the ambient temperature and/or humidity conditions.

7. An image recording apparatus, comprising:

driven elements supplied with driving energy to driven elements according to pixel data indicating pixel intensities to form an image; and an adjustment circuit altering the pixel data to change a low-intensity pixel to a high-intensity pixel, thereby enlarging a contiguous group of high-intensity pixels, if the low-intensity pixel is surrounded by a predetermined pattern of pixel intensities;

wherein the adjustment circuit also changes a high-intensity pixel to a low-intensity pixel, thereby enlarging a contiguous group of low-intensity pixels, if the high-intensity pixel is surrounded by another predetermined pattern of pixel intensities.

8. An image recording apparatus, comprising:

driven elements supplied with driving energy to driven elements according to pixel data indicating pixel intensities to form an image; and an adjustment circuit altering the pixel data to change a low-intensity pixel to a high-intensity pixel, thereby enlarging a contiguous group of high-intensity pixels, if the low-intensity pixel is surrounded by a predetermined pattern of pixel intensities;

wherein the low-intensity pixel changed to a high-intensity pixel is given different intensity levels depending on the surrounding pattern of pixel intensities.

9. An image recording apparatus, comprising:

driven elements supplied with driving energy to driven elements according to pixel data indicating pixel intensities to form an image;

an adjustment circuit altering the pixel data to change a low-intensity pixel to a high-intensity pixel, thereby enlarging a contiguous group of high-intensity pixels, if the low-intensity pixel is surrounded by a predetermined pattern of pixel intensities; and a sensor for sensing ambient temperature and/or humidity conditions, wherein the adjustment circuit adjusts said driving energy according to the ambient temperature and/or humidity conditions.

10. An image recording apparatus, comprising:

a first array of driven elements;

a second array of driving elements supplying energy to drive respective driven elements in the first array according to pixel data indicating pixel intensities, thereby recording an image; and a compensation circuit for adjusting the driving energy supplied by each driving element in the second array, the compensation circuit including an adjustment circuit for altering the pixel data to change a low-intensity pixel to a high-intensity pixel, thereby enlarging a contiguous group of high-intensity pixels, if the low-intensity pixel is surrounded by a predetermined pattern of pixel intensities;

wherein the adjustment circuit also changes a high-intensity pixel to a low-intensity pixel, thereby enlarging a contiguous group of low-intensity pixels, if the high-intensity pixel is surrounded by another predetermined pattern of pixel intensities.

11. An image recording apparatus, comprising:

a first array of driven elements;

a second array of driving elements supplying energy to drive respective driven elements in the first array according to pixel data indicating pixel intensities, thereby recording an image; and a compensation circuit for adjusting the driving energy supplied by each driving element in the second array, the compensation circuit including an adjustment circuit for altering the pixel data to change a low-intensity pixel to a high-intensity pixel, thereby enlarging a contiguous group of high-intensity pixels, if the low-intensity pixel is surrounded by a predetermined pattern of pixel intensities. wherein:

the data indicating pixel intensities are supplied sequentially, one line at a time;

the compensation circuit also includes an extraction circuit for extracting pixel data for an M×N pixel block with N columns of pixels in M lines, M and N being positive integers; and the low-intensity pixel altered to a high-intensity pixel is a central pixel in the M×N pixel block, and the predetermined pattern is an M×N pattern of pixel intensities.

12. The image recording apparatus of claim 11, wherein the adjustment circuit prestores a plurality of M×N patterns of pixel intensities, compares the M×N pixel block extracted by the extraction circuit with the plurality of M×N patterns, and thereby recognizes said predetermined pattern.

13. An image recording apparatus, comprising:

a first array of driven elements;

a second array of driving elements supplying energy to drive respective driven elements in the first array according to pixel data indicating pixel intensities, thereby recording an image; and a compensation circuit for adjusting the driving energy supplied by each driving element in the second array, the compensation circuit including an adjustment circuit for altering the pixel data to change a low-intensity pixel to a high-intensity pixel, thereby enlarging a contiguous group of high-intensity pixels, if the low-intensity pixel is surrounded by a predetermined pattern of pixel intensities;

wherein the low-intensity pixel changed to a high-intensity pixel is given different intensity levels depending on the surrounding pattern of pixel intensities.

14. A method of recording an image, comprising the steps of:

supplying driving energy to driven elements according to pixel data indicating pixel intensities; and altering the pixel data, if a low-intensity pixel is surrounded by a predetermined pattern of high-intensity pixels, by changing at least one of the high-intensity pixels to a low-intensity pixel, thereby creating an enlarged contiguous group of low-intensity pixels.

15. The method of claim 14, further comprising the step of altering the pixel data, to change the low-intensity pixel to a high-intensity pixel, thereby enlarging a contiguous group of high-intensity pixels, if the low-intensity pixel is surrounded by another pattern of pixel intensities.

16. The method of claim 15, wherein the low-intensity pixel changed to a high-intensity pixel is given different intensity levels depending on the surrounding pattern of pixel intensities.

17. The method of claim 14, further comprising the steps of:

sensing ambient temperature and/or humidity conditions; and adjusting said driving energy according to the ambient temperature and/or humidity conditions.

* * * * *